United States Patent
Kaminaka

(10) Patent No.: US 10,652,404 B2
(45) Date of Patent: May 12, 2020

(54) IMAGE FORMING DEVICE AND NON-TRANSITORY COMPUTER-READABLE RECORDING MEDIUM STORING PROGRAM

(71) Applicant: KONICA MINOLTA, INC., Chiyoda-ku, Tokyo (JP)

(72) Inventor: Junpei Kaminaka, Tokyo (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/056,834

(22) Filed: Aug. 7, 2018

(65) Prior Publication Data
US 2019/0068797 A1    Feb. 28, 2019

(30) Foreign Application Priority Data
Aug. 25, 2017  (JP) ................. 2017-162773

(51) Int. Cl.
*H04N 1/00*    (2006.01)
*H04N 1/32*    (2006.01)

(52) U.S. Cl.
CPC ....... *H04N 1/0009* (2013.01); *H04N 1/00037* (2013.01); *H04N 1/00092* (2013.01); *H04N 1/32694* (2013.01)

(58) Field of Classification Search
CPC ................................................ H04N 1/00092
See application file for complete search history.

(56) References Cited

U.S. PATENT DOCUMENTS

| | | | | |
|---|---|---|---|---|
| 5,592,683 A | * | 1/1997 | Chen | G06F 3/12 |
| | | | | 382/309 |
| 2005/0179926 A1 | * | 8/2005 | Nishikawa | G06F 3/1205 |
| | | | | 358/1.13 |
| 2007/0236723 A1 | * | 10/2007 | Gaertner | G06F 3/1208 |
| | | | | 358/1.15 |
| 2011/0063636 A1 | * | 3/2011 | Sakamoto | H04N 1/6022 |
| | | | | 358/1.9 |

(Continued)

FOREIGN PATENT DOCUMENTS

| | | |
|---|---|---|
| JP | 2001186315 A | 7/2001 |
| JP | 2005205722 A | 8/2005 |
| JP | 2010002463 A | 1/2010 |

*Primary Examiner* — King Y Poon
*Assistant Examiner* — Michael L Burleson
(74) *Attorney, Agent, or Firm* — Buchanan Ingersoll & Rooney PC

(57) ABSTRACT

An image forming device includes: an image forming unit that forms an image on a transfer medium in accordance with a JOB; and a controller that controls the image forming unit. The controller is capable of acquiring a read image obtained by reading the image on the transfer medium, and determining failure/no-failure in the image on the transfer medium in accordance with the read image. When the image is determined to have a failure in accordance with the determination, the controller saves, for each JOB, original image information related to at least a failure-detected page in which the failure has been detected in a state in which the original image information is associated with output history information, and makes at least the failure-detected page re-printable in accordance with the associated original image information.

13 Claims, 21 Drawing Sheets

(56) References Cited

U.S. PATENT DOCUMENTS

| | | | | |
|---|---|---|---|---|
| 2012/0327463 | A1* | 12/2012 | Mizuno | G06F 3/122 |
| | | | | 358/1.15 |
| 2012/0327474 | A1* | 12/2012 | Sato | G06K 15/1886 |
| | | | | 358/1.16 |
| 2013/0301070 | A1* | 11/2013 | Saisho | G06T 7/001 |
| | | | | 358/1.13 |
| 2015/0347060 | A1* | 12/2015 | Honda | G06F 3/121 |
| | | | | 358/1.14 |

* cited by examiner

IMAGE FORMING DEVICE AND NON-TRANSITORY COMPUTER-READABLE RECORDING MEDIUM STORING PROGRAM

The entire disclosure of Japanese patent Application No. 2017-162773, filed on Aug. 25, 2017, is incorporated herein by reference in its entirety.

BACKGROUND

Technological Field

This invention relates to an image forming device that can determine failure/no-failure of an image on a transfer medium, and a non-transitory computer-readable recording medium storing a program.

Description of the Related Art

In the field of image forming devices, an image forming device is known in which an image on a transfer medium is read, and failure/no-failure of an image on a sheet is detected based on the read image data. With such an image forming device, information about waste paper the image of which has been determined to be a failure can be checked through a display, and waste paper can be re-output, for example.

Japanese Patent Laid-Open No. 2005-205722, for example, discloses a technique in which a printed image is subjected to a defect test using test image data obtained by reading the printed image, and if any defect is detected, defect image data for which the defect has been detected is saved and a link to the defect image data is added to history information when the history information is presented on a display.

Japanese Patent Laid-Open No. 2001-186315 discloses an apparatus in which, just in case of occurrence of a printing failure, an image that has been printed out is saved and the saved image can optionally be re-printed.

Japanese Patent Laid-Open No. 2010-2463 discloses an apparatus in which the images on sheets that have been determined to be waste paper are stored in a storage as images to be reprinted out, and the images on waste paper are presented on a screen for selecting waste paper images to be reprinted out, so that the images on waste paper can optionally be reprinted out.

However, in conventional methods, when original image data to be printed related to a page in which a waste has been detected is saved and the page with the detected waste is reprinted out using the saved original image data, a desired printed material cannot always be produced. For example, the problem arise that when a JOB for which a waste has been detected is a bundle JOB, a double-sided JOB, a pagination-added JOB, or the like, reprinting due to waste paper in these JOBs gives an output different from a desired output of bundle or double-sided printing, pagination printing, or the like.

SUMMARY

An object of the present invention, which has been made to solve the above-described problem, is to provide an image forming device that can give a desired output upon reprinting after the detection of a failure in an image, and a non-transitory computer-readable recording medium storing a program.

To achieve at least one of the abovementioned objects, according to an aspect, an image forming device reflecting one aspect of the present invention includes:

an image forming unit that forms an image on a transfer medium in accordance with a JOB; and a controller that controls the image forming unit.

The controller is capable of acquiring a read image obtained by reading the image on the transfer medium, and determining failure/no-failure in the image on the transfer medium in accordance with the read image.

When the image is determined to have a failure in accordance with the determination, for each JOB, the controller saves original image information related to at least a failure-detected page in which the failure has been detected in a state in which the original image information is associated with output history information, and makes at least the failure-detected page re-printable in accordance with the associated original image information.

To achieve at least one of the abovementioned objects, according to an aspect, a non-transitory computer-readable recording medium storing a program reflecting one aspect of the present invention is a a non-transitory computer-readable recording medium storing a program executed on a computer controlling an image forming device for forming an image on a transfer medium.

The program causes the computer to perform:

acquiring a read image obtained by reading the image on the transfer medium;

determining failure/no-failure in the image in accordance with the read image;

when the image is determined to have a failure in accordance with the determination, for each JOB, saving original image information that is to be printed and is related to at least a failure-detected page in which the failure has been detected in a state in which the original image information is associated with output history information; and in response to a command to reprint the failure-detected page related to the JOB in accordance with the printing history information, controlling the execution of re-printing of at least the failure-detected page, in accordance with the associated original image information.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, an embodiment of the present invention will be described with reference to the drawings. However, the scope of the invention is not limited to the disclosed embodiments.

One embodiment of an image forming device of the present invention will now be described with reference to the accompanying drawings.

Figure 1:
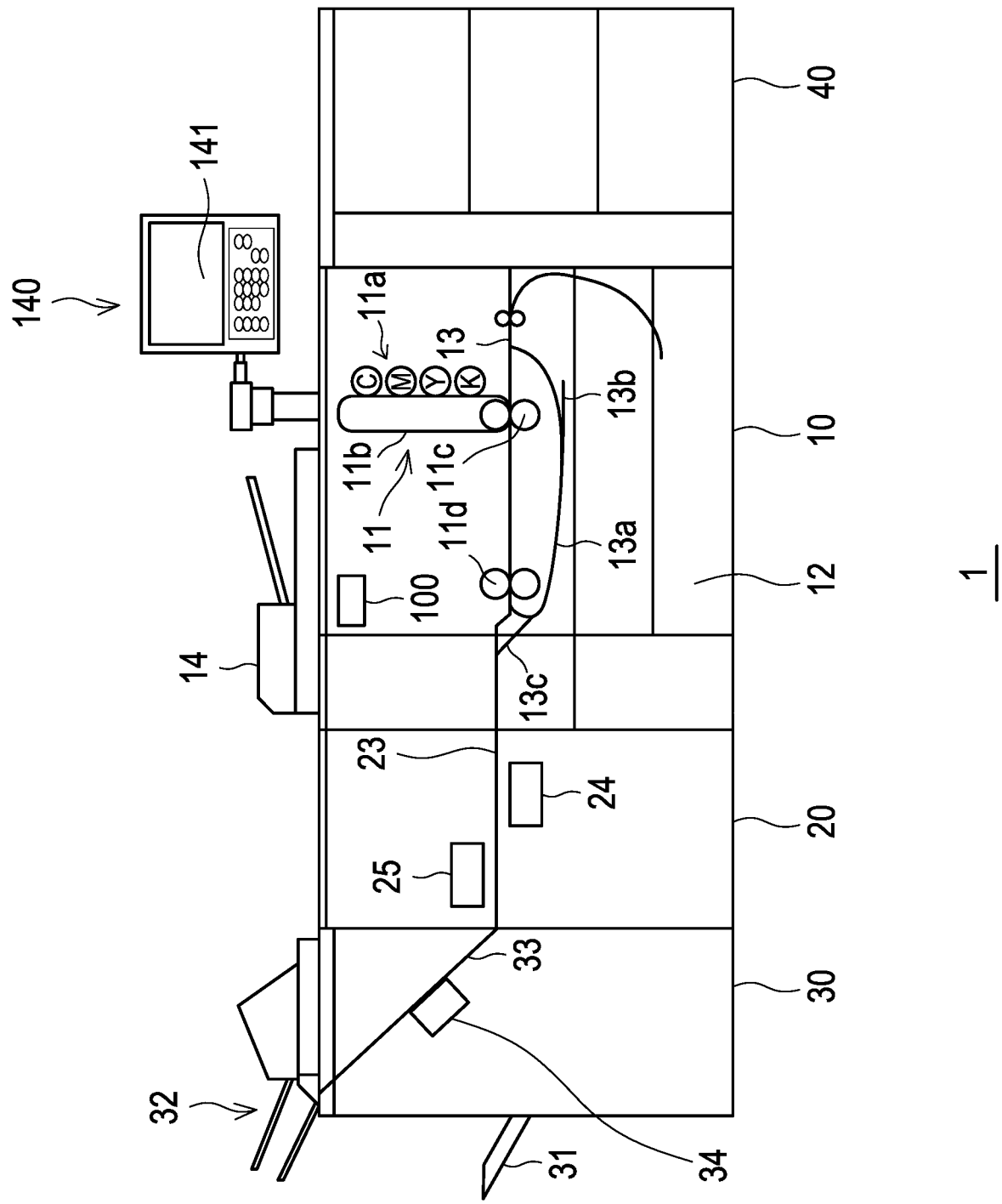
FIG. 1 is a schematic diagram showing the mechanical configuration of an image-forming device of one embodiment of the present invention.

As shown in FIG. 1, an image forming device 1 includes, in sequence from the upstream end of the sheet transport direction, a sheet feeder 40, a device body 10, a reading device 20, and an aftertreatment device 30. These devices are electrically and mechanically connected to each other so that information communication can be established between the devices and sheets can be transported between the devices.

Although these devices constitute the image forming device 1 in this embodiment, the configuration of an image forming device of the present invention is not limited to this. For example, the image forming device can consist of the device body 10 and the image reading device 20. Alternatively, the image forming device can consist of only the device body 10, and an image forming system can be provided which consists of the device body 10 provided with the reading device 20, the aftertreatment device 30, the sheet feeder 40, and the like. The reading device can be provided in the device body.

The sheet feeder 40 has multiple sheet feeding tiers each containing sheets. The sheets in each sheet feeding tier are transported to the transport path 13 of the device body 10 and images are formed on the sheets in the device body 10. A sheet corresponds to a transfer medium of the present invention. In the present invention, the material for the transfer medium is not limited to paper and can be a cloth or a plastic sheet. In addition, a transfer medium of the present invention can be a continuous transfer medium, such as a continuous sheet of paper, and can be cut before image formation or after image formation. The device body 10 is connected to the subsequent stage of the sheet feeder 40.

The device body 10 has an operating unit 140 on its housing. The operating unit 140 has a touch screen LCD 141 and an operation key group, such as a ten-key numeric pad, so that it can display information and receive operational inputs.

The device body 10 further has an automatic document feeding device (ADF) 14 above its housing. The automatic document feeding device (ADF) 14 automatically feeds a document placed on a document table, and the document fed by the automatic document feeding device (ADF) 14 is read by a scanner unit 130 shown in FIG. 2.

It should be noted that the document can also be read through a platen glass not shown in the drawing.

The device body 10 has an in-body sheet feeder 12 in the lower part. The in-body sheet feeder 12 contains sheets and the sheets in the in-body sheet feeder 12 are transported to the transport path 13. A sheet corresponds to a transfer medium of the present invention. It should be noted that a transfer medium in the in-body sheet feeder 12 can be anything other than a sheet, like that in the sheet feeder 40.

Rollers and the like, which are not shown in the drawing, are provided around the transport path 13 in the device body 10, and the transport path 13 carries sheets fed from the sheet feeder 40 or the in-body sheet feeder 12.

Further, an image forming unit 11 for forming images on sheets is provided in the middle of the transport path 13 in the device body 10.

The image forming unit 11 includes photoreceptors 11a for the respective colors (cyan, magenta, yellow, and black), and, around the photoreceptors 11a, a charger, an LD, a developer unit, a cleaner unit, and the like, which are not shown in the drawing. Further, the image forming unit 11 has a midpoint transfer belt 11b in such a position that it can come in contact with the photoreceptors 11a prepared for the respective colors. The midpoint transfer belt 11b comes in contact with a sheet on the transport path 13 through a secondary transfer unit 11c provided in the middle of the midpoint transfer belt 11b. The transport path 13 is provided with a fixer 11d located downstream of the secondary transfer unit 11c.

To form an image on a sheet, the charger causes the photoreceptors 11a to be uniformly charged, the charged photoreceptors 11a are irradiated with a laser beam from the LD so that a latent image is formed on the photoreceptors 11a, and the latent image formed on the photoreceptor 11a is developed by the developer unit and becomes a toner image.

The toner image formed on the photoreceptors prepared for the respective colors is transferred to the midpoint transfer belt 11b, and the image on the midpoint transfer belt 11b is transferred to a sheet by the secondary transfer unit 11c. The fixer 11d then heats the sheet, thereby fixing the image on the sheet.

The transport path 13 includes a reverse transport path 13a branched downstream of the fixer 11d. A downstream transport path 13c is branched from the reverse transport path 13a and, in a position located downstream of that, an evacuation transport path 13b is branched from the reverse transport path 13a. In a position located downstream of where the evacuation transport path 13b is branched, the reverse transport path 13a meets the transport path 13 in a position located upstream of the image forming unit 11.

When being only required to be turned over, a sheet transported to the reverse transport path 13a is temporarily passed to the evacuation transport path 13b and then reversely passed to the downstream transport path 13c. The downstream transport path 13c meets the transport path 13 in a downstream part of the transport direction, and a turned-over sheet passed to the downstream transport path 13c is transported to a downstream part through the transport path 13.

To turn over a sheet and circulate it into the image forming unit 11, the sheet is temporarily passed from the reverse transport path 13a to the evacuation transport path 13b, is reversely passed to the downstream reverse transport path 13a, and meets the transport path 13 in a position located upstream of the image forming unit 11. Afterwards, the image is formed on the back side of the sheet. A sheet that has been undergone image formation is transported to the transport path 23 in the reading device 20 in the following stage.

The device body 10 includes a control unit 100. The control unit 100 controls the entire image forming device 1 and consists of a CPU, a memory, and the like. It should be noted that the control unit can be provided out of the device body.

The reading device 20 includes the transport path 23 joined to the transport path 13, and sheets are transported along the transport path 23.

In the middle of the transport path 23, an image reading unit 24 that reads the image on the back side of the transported sheet, and an image reading unit 25 that reads the image on the front side of the sheet are provided in sequence in the sheet transport direction. Image data acquired by reading through the image reading units 24 and 25 is transmitted to the control unit 100 in the device body 10, as the reading results. The control unit 100 can perform, based on the acquired image data, waste determination by comparison with a correct image, various types of processing, adjustment of the image forming unit 11, and the like.

The image reading units 24 and 25 can each consist of a CCD sensor, a CMOS sensor, or the like, and can read an image for the full width of the sheet. In the present invention, any number of image reading units can be provided and it is acceptable even if only one image reading unit is provided. In the case where one image reading unit reads the image on the both sides of the sheet, after reading of one side, the sheet can be turned over for reading of the other side. Alternatively, a colorimeter which reads the image point by point can be used. Although two image reading units are supposed to be provided in this embodiment, any number of, e.g., one or three or more image reading units can be provided in the present invention. In use of multiple image reading units, they can be of different types. Although image normality/abnormality determination is supposed to be conducted in the control unit 100 in this embodiment, such image determination can be conducted in the reading device 20. In this case, the image read through the image reading units 24 and 25 are acquired through a reading control unit (not shown in the drawing) provided in the reading device 20, and the reading control unit can perform image failure/no-failure determination. In this case, the control unit 100 in the device body 10 and the reading control unit can work in cooperation with each other and thus serve as a controller of the present invention.

The aftertreatment device 30 includes a transport path 33 that is joined to the transport path 23 of the reading device 20 and carries sheets. The transport path 33 has an aftertreatment unit 34 in the middle.

The aftertreatment unit 34 can execute predetermined aftertreatment. Examples of aftertreatment include stapling, punching, bounding, and other appropriate processing, and aftertreatment involving folding for making a tri fold, saddle stitch, Z fold, gate fold, French fold, and the like. The aftertreatment unit 34 can perform more than one types of aftertreatment.

The transport path 33 branches in the middle and joins a first sheet-ejecting unit 31 and a second sheet-ejecting unit 32. A sheet that has passed through the aftertreatment unit 34 can be ejected to the second sheet-ejecting unit 32, and a sheet that has skipped aftertreatment can be ejected to the first sheet-ejecting unit 31. It should be noted that a sheet that skips aftertreatment can be ejected to the second sheet-ejecting unit 32.

Although the aforementioned embodiment describes an image forming device that achieves color printing, an image forming device in the present invention can perform monochrome printing.

Figure 2:
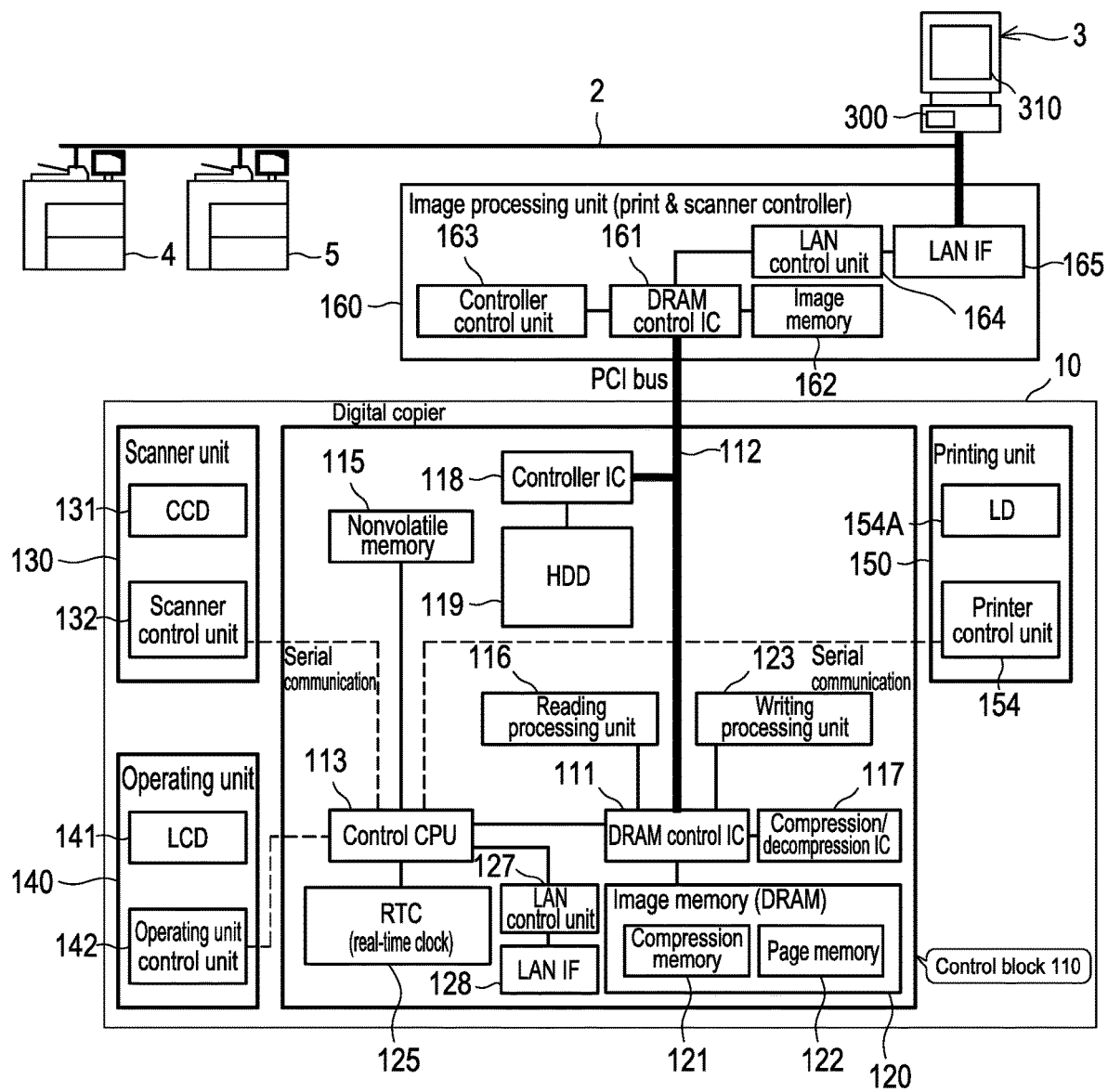
FIG. 2 is similarly a function block diagram.

A control block of the image forming device 1 will now be described with reference to FIG. 2.

The image forming device 1 mainly includes a digital copier, an image processing unit (print & scanner controller) 160. The digital copier includes a control block 110, a scanner unit 130, an operating unit 140, and a printing unit 150. The image processing unit (print & scanner controller) 160 executes processing of image data to/from an external device.

The control block 110 includes a PCI bus 112. The PCI bus 112 is connected to a DRAM control IC 111 in the control block 110.

The PCI bus 112 is connected to an HDD 119 through a controller IC 118. The HDD 119 can store required data, such as image data, JOB data, and data of a correct image used to detect waste. The HDD 119 corresponds to a storage of the present invention.

In the control block 110, the DRAM control IC 111 is connected to a control CPU 113.

The control CPU 113 is connected to a nonvolatile memory 115. The nonvolatile memory 115 stores a program to be executed by the control CPU 113, data of machine settings in the image forming device 1, process control parameters, information about the JOB output history, setting information including sheet information, and the like in a readable and writable manner. In addition, the nonvolatile memory 115 can store image data and the like related to a page in which a failure has been detected (hereinafter referred to as "waste has been detected" as appropriate). Further, when being stored, original image data related to, for example, a page in which waste has been detected, data of a correct image to be used for waste detection, and the like can be associated with printing history information, and the printing history can include JOB setting information. As JOB setting information, in addition to sheet information and information about a destination ejection tray, which type of printing, such as a bundle JOB, e.g., booklet printing, double-sided printing, or a JOB involving addition of pagination information, will be performed is stored, for example.

The control CPU 113 can control the components of the image forming device 1 by executing a program, can control sheet transport and image formation, and performs failure determination (hereinafter referred to as "waste determination" as appropriate) for the output, and reprinting, for example. In particular, the control CPU 113 and the program executed by the control CPU 113 constitute the controller of the present invention. The program operated in the control CPU 113 includes a program of the present invention. In particular, the program of the present invention is operated on a computer which corresponds to the control unit 100. It should be noted that the program can be stored in a portable recording medium. These data can be stored in the HDD 119. Although reprinting is supposed to be executed through the operation of the control CPU 113 in this embodiment, it is acceptable that the original image information is saved being associated with printing history information so that the data can be provided to allow other image forming devices to perform reprinting.

The control CPU 113 is connected to a real-time clock (RTC) 125, so that date time data can be transmitted to the control CPU 113.

In addition, the control CPU 113 is connected to the scanner control unit 132 of the scanner unit 130 such that they can serially communicate with each other.

The scanner unit 130 includes a CCD 131 and a scanner control unit 132. The CCD 131 optically reads the image on the sheet, and the scanner control unit 132 controls the entire scanner unit 130. The scanner control unit 132 is connected to the control CPU 113 such that they can serially communicate with each other, and is controlled by the control CPU 113. It should be noted that the scanner control unit 132 can be composed of a CPU, a program for operating the CPU, and the like.

Image data read through the CCD 131 is transmitted to the reading processing unit 116 through the DRAM control IC 111, and is subjected to predetermined correction and other processing in the reading processing unit 116. The reading processing unit 116 is connected to the DRAM control IC 111.

The operating unit 140 includes the touch screen LCD 141 and an operating unit control unit 142. Various types of information can be presented and operational inputs can be achieved on the LCD 141. It should be noted that operational inputs can also be achieved through operational keys, for example. For example, upon detection of waste, an original image, a waste image, and a correct image related to waste paper can be presented. Further, upon detection of waste, operations for an instruction to re-output and an instruction to re-output all pages or a selected page related to waste paper can be achieved.

The operating unit control unit 142 controls the entire operating unit 140. The operating unit control unit 142 is connected to the control CPU 113 such that they can serially communicate with each other, and the operating unit 140 is controlled by the control CPU 113. The operating unit control unit 142 can be composed of a CPU, a program for operating the CPU, and the like.

On the operating unit 140, various settings for the device body 10, the reading device 20, the aftertreatment device 30, and the like can be made by operational inputs through the LCD 141 and the operational keys. According to the settings, the control unit controls image formation, sheet transport, the need for waste determination, the need for aftertreatment, and the like.

Further, on the operating unit 140, settings and operation commands and other operation control conditions related to the image forming device 1 can be input, and the set contents, the machine state, information can be presented.

For example, the JOB output history and the history information related to a JOB that includes waste according to the determination in the waste determination function, which will be described later, can be presented. The operating unit 140 corresponds to a display of the present invention.

The DRAM control IC 111 is connected to an image memory 120. The image memory 120 can store image data acquired through the scanner unit 130 and image data acquired through an external device via a network 2. In other words, the image memory 120 can store image data related to JOBs to be printed.

The image memory 120 includes a compression memory 121 and a page memory 122. The compression memory 121 stores compressed image data, and the page memory 122 temporarily stores uncompressed page image data for image formation.

In addition, the image memory 120 can store image data related to more than one JOBs. The image memory 120 can further store JOB setting information and image data related to reserved JOBs. It should be noted that these data can also be stored in the HDD 119.

The DRAM control IC 111 is connected to a compression/decompression IC 117. In the compression/decompression IC 117, image data can be compressed or compressed image data can be decompressed.

The DRAM control IC 111 is further connected to a writing processing unit 123. The writing processing unit 123 performs processing of data to be used in the image forming operation of an LD 154A.

The control CPU 113 is connected to a printer control unit 154 provided in the printing unit 150. The printer control unit 154 is composed of a CPU, a storage, and the like and, upon reception of a command from the control CPU 113, controls the entire printing unit 150 and the image forming operation of the LD 154A. The LD 154A is the collective name of the LDs for the respective colors. Further, the printing unit 150 can control a transfer unit including the image forming unit 11 and the transfer path 22.

Further, the control CPU 113 is connected to a LAN control unit 127. The LAN control unit 127 is connected to a LAN interface 128. The LAN interface 128 can be connected to a network 2 and other networks, and data communication with external devices can be established through the LAN interface 128.

Further, the PCI bus 112 is connected to a DRAM control IC 161 provided in the image processing unit (print & scanner controller) 160.

In the image processing unit (print & scanner controller) 160, the DRAM control IC 161 is connected to an image memory 162, and the DRAM control IC 161 is connected to a controller control unit 163. Further, the DRAM control IC 161 is connected to a LAN control unit 164 and a LAN interface 165. The LAN interface 165 is connected to the network 2.

The network 2 is connected to an external device 3, other image forming devices 4 and 5, and the like, and the image forming device 1 can transmit/receive data to/from the external device 3 and other image forming devices via the network 2. It should be noted that the network 2 can be used as a WAN instead of a LAN and can be connected wirelessly or wired.

The external device 3 can be used as a device serving as a terminal or a device for managing the image forming device. The external device 3 includes an external device control unit 300 that controls the entire external device 3, and the external device control unit 300 can be composed of a CPU, a program for operating the CPU, a storage, and the like. It should be noted that the external device control unit 300 can manage the image forming devices 1, 4, and 5 through communication. In this case, the external device control unit 300 serves as a control unit for managing image forming devices.

In addition, the external device 3 has an external display 310 on which information can be presented. JOB output history information and the like can be presented on the external display 310.

The external device 3 can directly control the image forming device or instruct the image forming device to operate according to the control content so that the control unit in the image forming device exercises control according to the instruction.

The external device 3 can acquire the reading results from the reading device 20, perform sheet failure/no-failure determination, and exercise control of saving of the original image related to the failure detection sheet and reprinting in the image forming device. In this embodiment, the program operating on the external device control unit 300 corresponds to a program of the present invention which operates on the external device control unit 300 serving as a computer.

The basic operation of the image forming device 1 will now be explained.

First, a process for accumulating image data in the imaging device 1 will be explained.

In the case where the image of a document is read by the scanner unit 130 to generate image data, the document is placed over the scanner unit 130 and the image of the document is optically read through the CCD 131. At this time, the scanner control unit 132 receiving an instruction from the control CPU 113 controls the operation of the CCD 131.

The Image read through the CCD 131 is transmitted to the reading processing unit 116, and is subjected to predetermined data processing in the reading processing unit 116. The image data that has undergone data processing is transmitted to the compression/decompression IC 117, is compressed in the compression/decompression IC 117 with a predetermined scheme, and then is stored in the compression memory 121 and the HDD 119 through the DRAM control IC 111.

The image data stored in the compression memory 121 and the HDD 119 can be managed by the control CPU 113 as a JOB.

Meanwhile, in the case where image data is acquired from an external device, for example, in the case where image data is acquired from the external device 3, the other image forming devices 4 and 5, or the like through the network 2, image data is received through the LAN interface 165 of the image processing unit (print & scanner controller) 160. The received image data is stored in the image memory 162 through the LAN interface 165, the LAN control unit 164, and the DRAM control IC 161.

Afterwards, the image data stored in the image memory 162 is temporarily stored in the page memory 122 through the DRAM control IC 161, the PCI bus 112, and the DRAM control IC 111.

The image data stored in the page memory 122 is sequentially transmitted to the compression/decompression IC 117 via the DRAM control IC 111 to be subjected to compression. The compressed image data is transmitted to the compression memory 121 and the HDD 119 through the DRAM control IC 111 and is stored in the compression memory 121 and the HDD 119. The stored image data is managed by the control CPU 113.

When the image forming device 1 outputs an image, i.e., when it is used as a copier or printer, image data stored in the compression memory 121, the nonvolatile memory 115, the HDD 119, and the like is transmitted to the compression/decompression IC 117 through the DRAM control IC 111 and the image data is then decompressed. The decompressed image data is transmitted to the writing processing unit 123 through the DRAM control IC 111 and is repeatedly expanded by the writing processing unit 123 into the LD 154A, so that image formation based on the image data is performed through the LD 154A and the sheet is printed with the image data through the electrophotographic scheme.

When the image forming device 1 is used as a copier, information about a printing condition (print mode) and the like set on the operating unit 140 is notified and the control CPU 113 creates setting information. Created setting information can be stored in the RAM of the control CPU 113.

When the image forming device 1 is used as a printer, the printing conditions can be set with the printer driver in the external device 3. Similarly to images, the printing condition set here is transmitted to the external device 3, the LAN IF 165, the image memory 162, the DRAM control IC 161 (controller), the DRAM control IC 111 (body), and then the page memory 122, and is stored in the page memory 122.

Waste detection and re-output by the image forming device 1 for a page on which waste has been detected will now be explained.

In the image forming device 1, the image forming unit 11 acquires read image data, which is obtained by reading a sheet with an image through the image reading units 24 and 25, as reading results. Afterwards, comparison between the acquired read image data and a correct image prepared in advance is performed, and failure/no-failure of the image on the sheet can be determined according to the comparison results. Determination of failure/no-failure of the image is achieved by pattern matching or other methods, for example. When the difference according to the comparison results is at or higher a predetermined value, the image is determined to have a failure. It should be noted that the criterion for determining waste according to the comparison results can be changeable by a user. Waste detection can be performed by any method other than those using a comparison with a correct image.

A page including an image that has been determined to have a failure is determined to be a waste-detected page, and a sheet including a waste-detected page is determined to be a waste sheet (waste paper). When waste is detected, printing can be halted or waste paper can be ejected to a spot different from a normal ejection destination. A waste-detected page corresponds to a failure-detected page of the present invention.

It should be noted that an image used for waste determination can be a correct image obtained by, for example, printing an image in advance before the output of the JOB and reading the printed image. Further, the original printing image can be used as a comparative image. Comparative images can be stored in the nonvolatile memory 115, the HDD 119, and the like.

When waste is detected, as shown in Table 1 below, JOB information is registered to a waste detection history list which can be stored in the nonvolatile memory 115 and the HDD 119. At this time, the original image information related to the waste-detected page is stored together. The original image information refers to image data that has been used for printing. Table 1 is an example waste detection history list. It should be noted that the data destination is not limited to the storage of the image forming device 1 and can be any storage other than that in the image forming device; for example, original image information, printing history information, and the like can be stored in an external storage device connected via a network.

In the example shown in Table 1, the date and time of the output, ID, file name, the number of sheets, and the number of copies related to the JOB for which waste has been detected are registered.

The waste-detected sheet field shows operational "view" buttons. Pressing a "view" button achieves a transition from the waste detection history list screen to a screen shown in FIG. 3 for presenting the original image of the waste-detected sheet. In Table 1, pressing a "delete" button deletes waste detection history information and original image information related to the target JOB.

It should be noted that the waste detection list can be presented on the operating unit 140 of the image forming device 1, the external display 310 of the external device 3, a display on other devices for managing the image forming device 1, a terminal, or the like.

A waste detection history list in this embodiment corresponds to printing history information of the present invention. Original image information is associated with printing history information. A jobID includes JOB setting information and is saved, being associated with JOB setting information. In this embodiment, JOBs for which waste has been detected are shown in the list as printing history information. Alternatively, JOBs including those for which waste has not been detected can be saved and presented as a printing history.

TABLE 1

| Date | JobID | FileName | Number of Sheets | Number of Copies | Waste-Detected Sheets | |
|---|---|---|---|---|---|---|
| 2017 Apr. 1 | 1 | Test1 | 3 | 10 | View | Delete |
| 2017 Apr. 2 | 2 | Test2 | 5 | 5 | View | Delete |
| 2017 Apr. 3 | 3 | Test3 | 10 | 3 | View | Delete |

Figure 3:
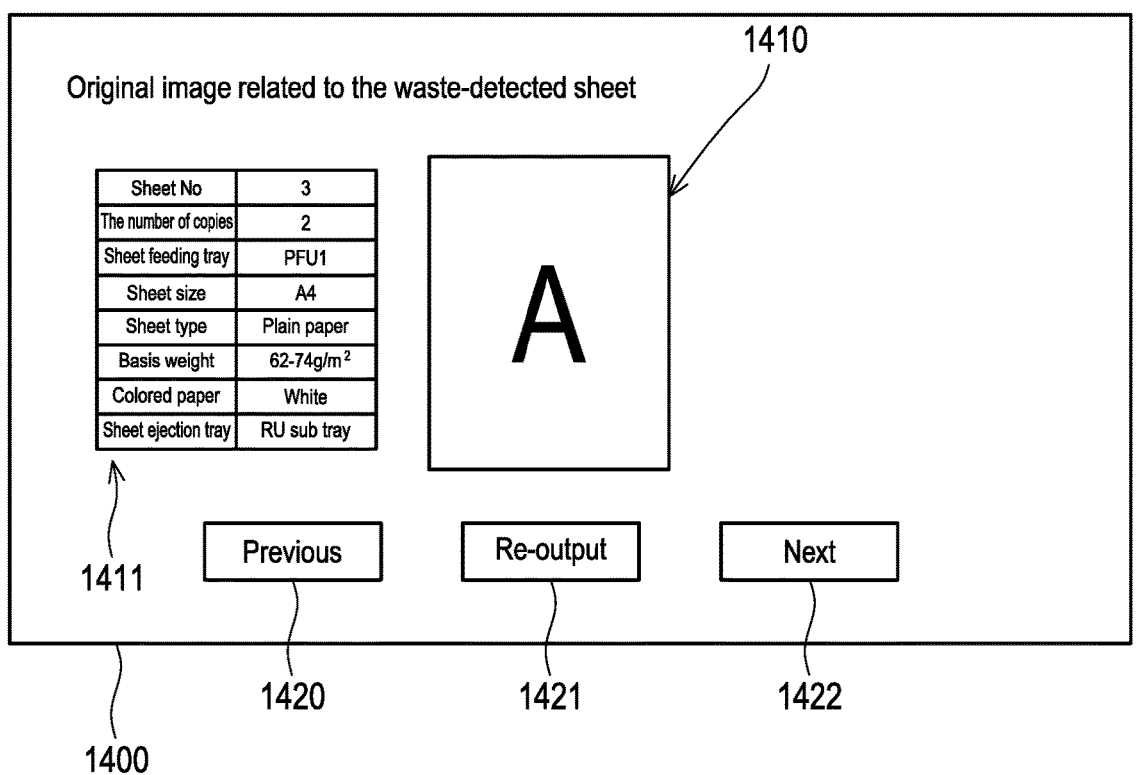
FIG. 3 is similarly a diagram showing an original image display screen related to a waste-detected sheet.

FIG. 3 is a diagram illustrating a display screen 1400 showing the original image. The display screen 1400 can be presented on the operating unit 140, the external display 310 of the external device 3, or the like.

On the display screen 1400, the original image 1410 is shown in the central portion, and the JOB setting information 1411 is shown on the left side of the display area of the original image 1410. Here, the JOB setting information 1411 shows information about the waste-detected sheet No., the number of copies, sheet feeding tray, sheet size, sheet type, basis weight, colored paper, and sheet ejection tray. In the present invention, any type of information can be presented and information other than those described above can be presented.

Further, a "previous" button 1420, a "re-output" button 1421, and a "next" button 1422 are shown below the display area of the original image. When more than one waste-detected pages exist, pressing the "previous" button 1420 presents the previous original image, and pressing the "next" button 1422 presents the next original image. Pressing the "re-output" button 1421 can generate a JOB for outputting a waste-detected page and output it. Alternatively, pressing the "previous" or "next" button can present another waste-detected page.

Figure 4:
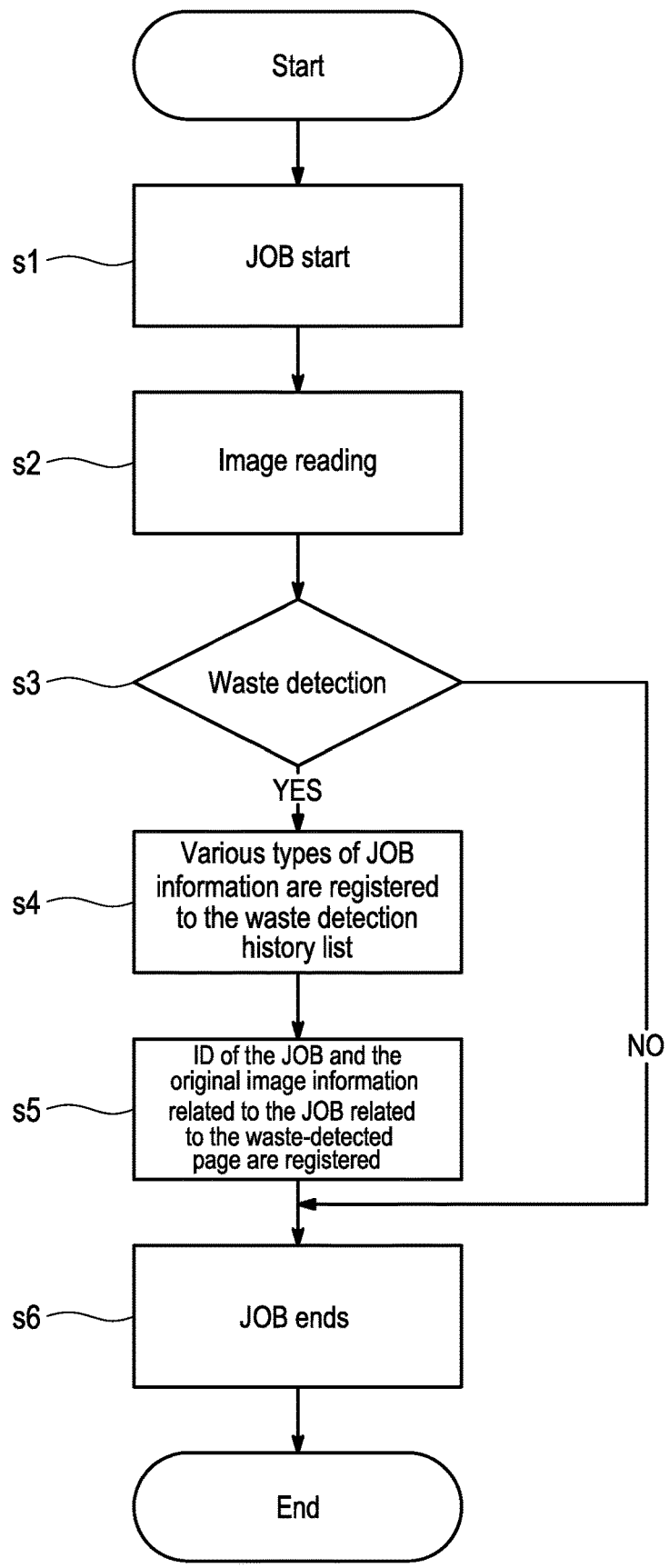
FIG. 4 is similarly a flow chart showing a process for storing information related to a waste-detected page in the event of waste detection.
Figure 5:
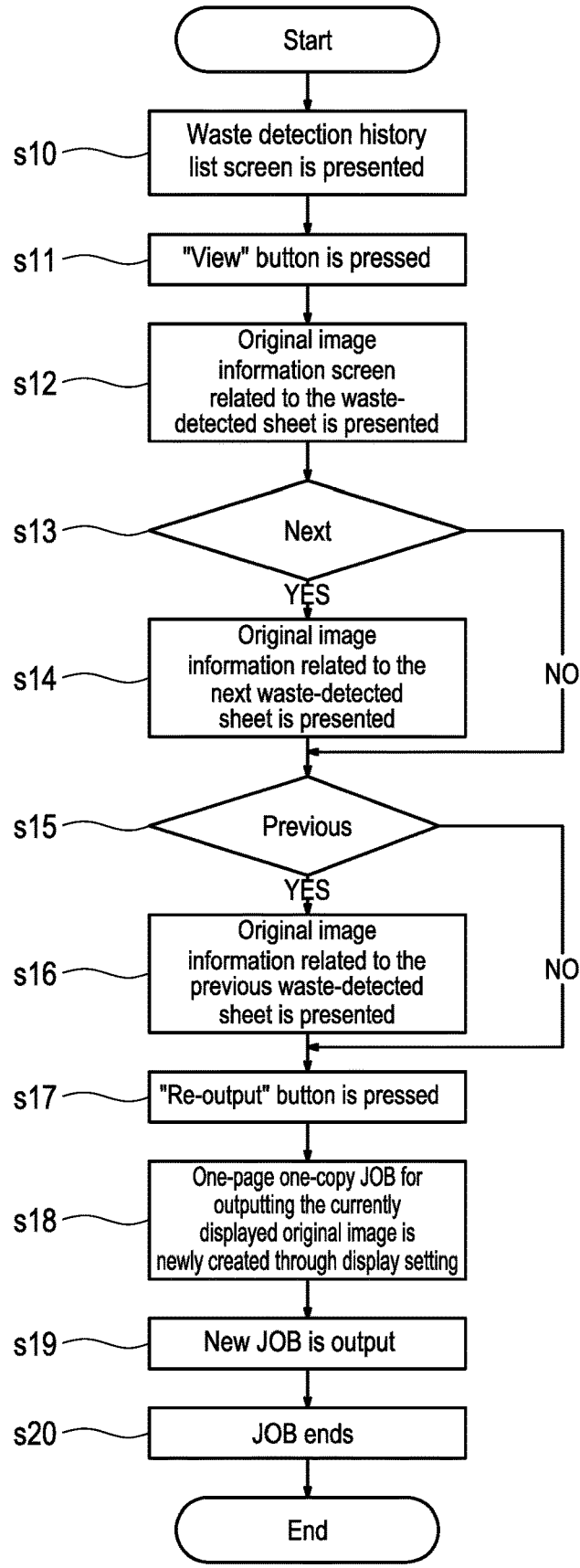
FIG. 5 is similarly a flow chart showing a process for re-outputting a waste-detected page.

Next, the details of the operations during waste detection and re-output will now be described with reference to FIGS. 4 and 5. It should be noted that the following process is executed under control by the control unit 100 or the external device control unit 300. Similarly, the following flow chart is executed under control by the control unit 100 or the external device control unit 300.

A process for saving original image data during waste detection will now be explained with reference to the flow chart shown in FIG. 4.

First, a JOB is started (Step s1). Upon the JOB start, an image can be formed on a sheet in accordance with the JOB. Afterwards, the image on the sheet is read, and the read image, that is, reading results is acquired (Step s2). Image reading can be performed by the image reading unit of the image forming device. Alternatively, the reading results read through an image reading device outside the image forming device can be acquired. In the case where reading is performed in an external device outside the image forming device, a command to perform reading is sent to the external device, and the reading results are acquired from the external device.

Next, failure/no-failure in the image is determined based on the read image (Step s3). Image failure/no-failure can be determined by comparison between the correct image acquired in advance and the read image. In the present invention, the method of image failure/no-failure determination is not limited to this.

If waste is detected by the image failure/no-failure determination (Step s3, YES), various types of JOB information are registered to the waste detection history list (Step s4), and the ID of the JOB and the original image information related to the JOB related to the waste-detected page are registered (Step s5). The JOB then ends (Step s6). In contrast, if no waste is detected in Step s3 (Step s3, NO), the process proceeds to Step s6 and the JOB ends (Step s6).

A process for re-outputting a waste-detected page will now be explained with reference to the flow chart of FIG. 5.

First, the waste detection history list screen shown in FIG. 3 is presented (Step s10). If the "view" button in the waste-detected sheet field related to a JOB to re-output is pressed on the waste detection history list screen (Step s11), an original image information screen related to the waste-detected sheet is presented (Step s12).

Next, if the "next" button on the original image information screen has been pressed is determined (Step s13). If the "next" button is pressed on the original image information screen (Step s13, YES), the original image information related to the next waste-detected sheet is presented (Step s14).

After Step s14 or if the "next" button is not pressed in Step s13 (Step s13, NO), whether the "previous" button has been pressed on the original image information screen is determined (Step s15).

If the "previous" button is pressed on the original image information screen (Step s15, YES), the original image information related to the previous waste-detected sheet is presented (Step s16).

After Step s16 or if the "previous" button is not pressed in Step s15 (Step s15, NO), the "re-output" button is pressed (Step s17), so that a one-page one-copy JOB for outputting the currently displayed original image is newly created through display setting (Step s18), the new JOB is output (Step s19), and the JOB ends (Step s20). Through this process, the waste-detected page can be reprinted.

(In Case of Bundle JOB)

The JOB for which waste has been detected can be a bundle JOB. A bundle JOB is a JOB for which aftertreatment, such as stapling or booklet treatment, is performed after image formation and the output is in the form of a bundle. In the case of a bundle JOB for which waste has been detected, saving only the original image information related to the waste-detected page and performing reprinting does not yield a desired output.

In this embodiment, in the case where the printing job is a bundle JOB, the original image information related to all pages including the waste-detected page is saved and associated with printing history information. In response to a command to re-output the waste-detected page, all pages including the waste-detected page are reprinted.

Figure 6:
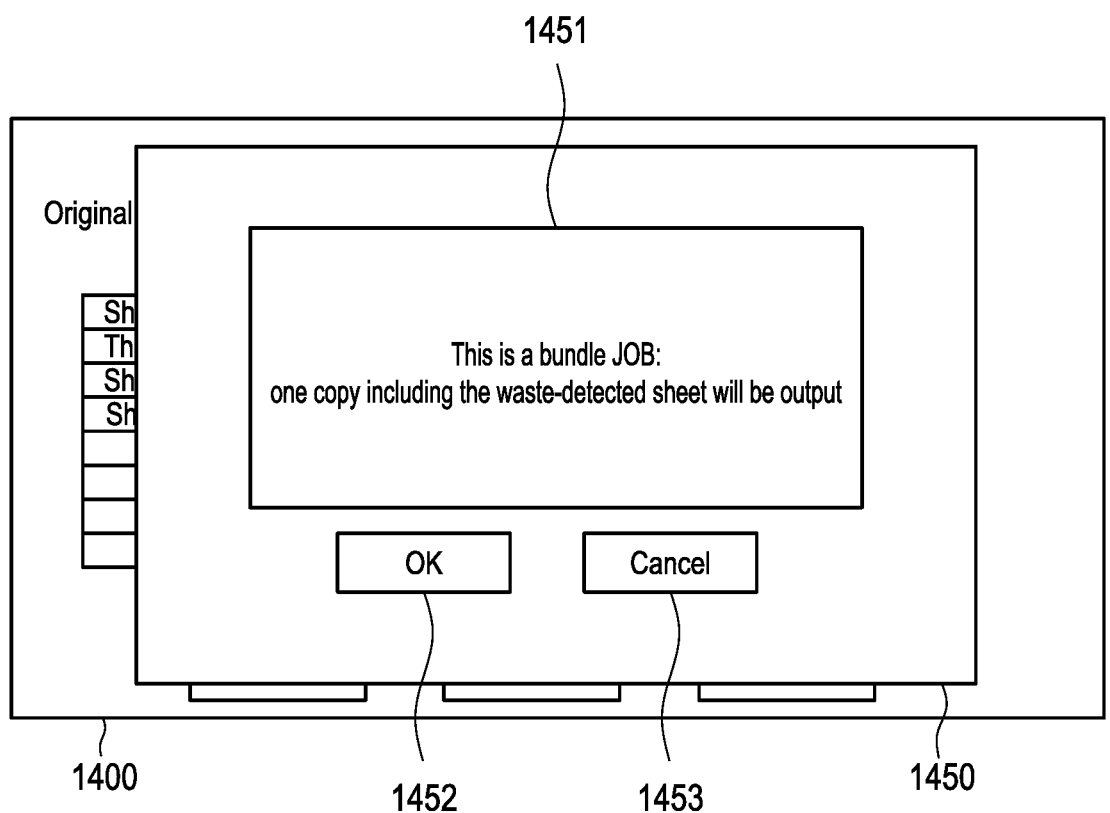
FIG. 6 is similarly a diagram showing a setting confirmation screen related to one-copy output by a bundle JOB.

In the case where the JOB for which waste has been detected is a bundle JOB, pressing the "re-output" button 1421 on the display screen 1400 in FIG. 3 causes a pop-up window 1450 to appear on the display screen 1400, as shown in FIG. 6.

A message field 1451 in the pop-up window 1450 shows the message "This is a bundle JOB: one copy including the waste-detected sheet will be output".

An "OK" button 1452 and a "cancel" button 1453 are shown below the message field 1451, and pressing the "OK" button outputs one copy. Pressing the "cancel" button 1453 cancels the output and closes the pop-up window 1450.

Figure 7:
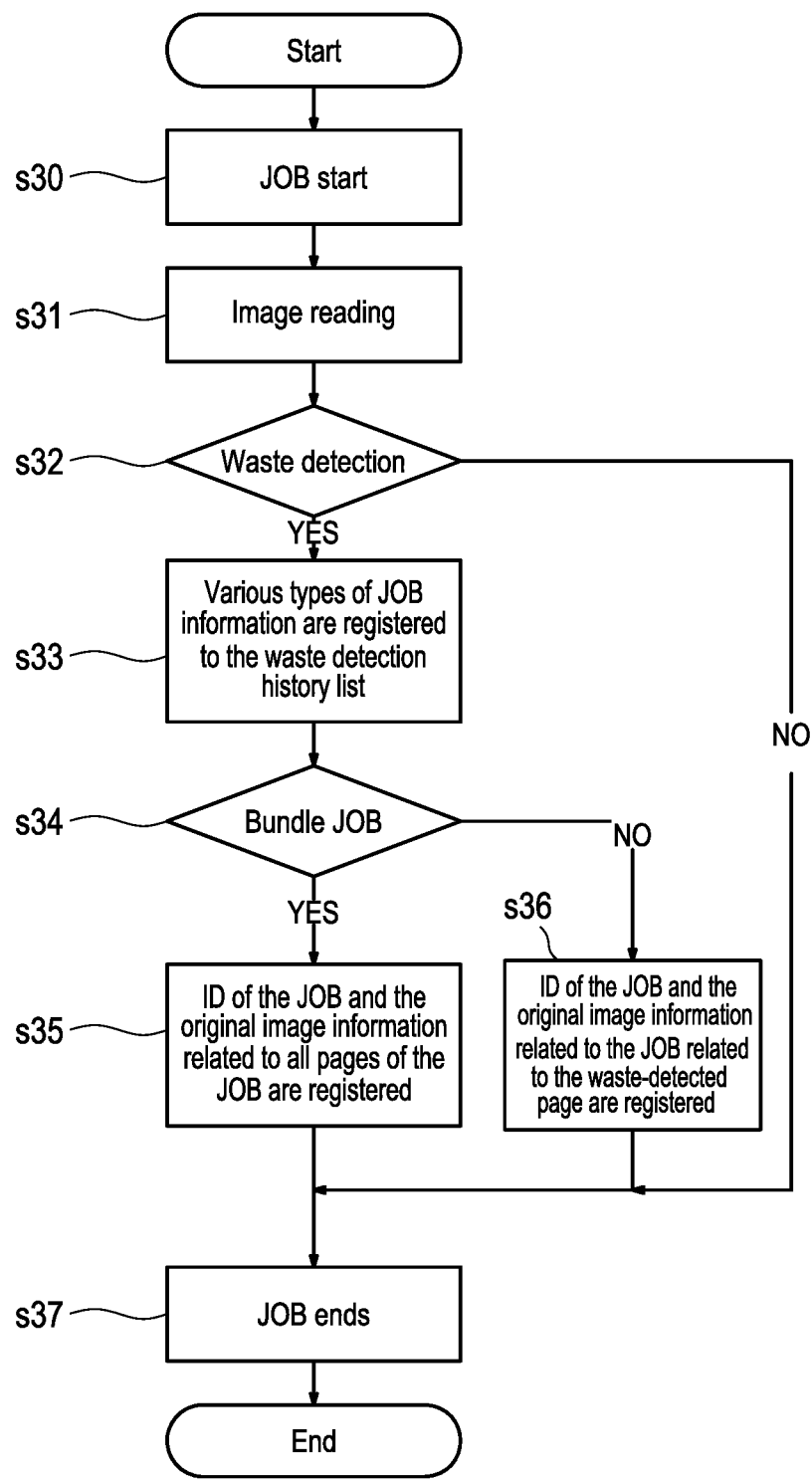
FIG. 7 is similarly a flow chart showing a process for storing information related to a waste-detected page in the event of waste detection in a bundle JOB.

A process executed in the event of waste detection in a bundle JOB will now be explained with reference to the flow chart shown in FIG. 7.

The JOB starts (Step s30), and the image on the sheet is read (Step s31) as in Step s2. Next, failure/no-failure in the read image is determined (Step s32).

When waste is detected by failure/no-failure determination for the read image (Step s32, YES), various types of JOB information is registered to the waste detection history list (Step s33), and whether the JOB is a bundle JOB is determined (Step s34). The determination can be performed according to, for example, information about output settings for the JOB. If the JOB is a bundle JOB (Step s34, YES), the ID of the JOB and the original image information related to all pages of the JOB are registered (Step s35), and the JOB ends (Step s37). If no waste is detected (Step s32, NO), the JOB ends (Step s37).

If the JOB is not a bundle JOB in Step s34 (Step s34, NO), the ID of the JOB and the original image information related to the waste-detected page of the JOB are registered (Step s36), and the JOB ends (Step s37).

Figure 8:
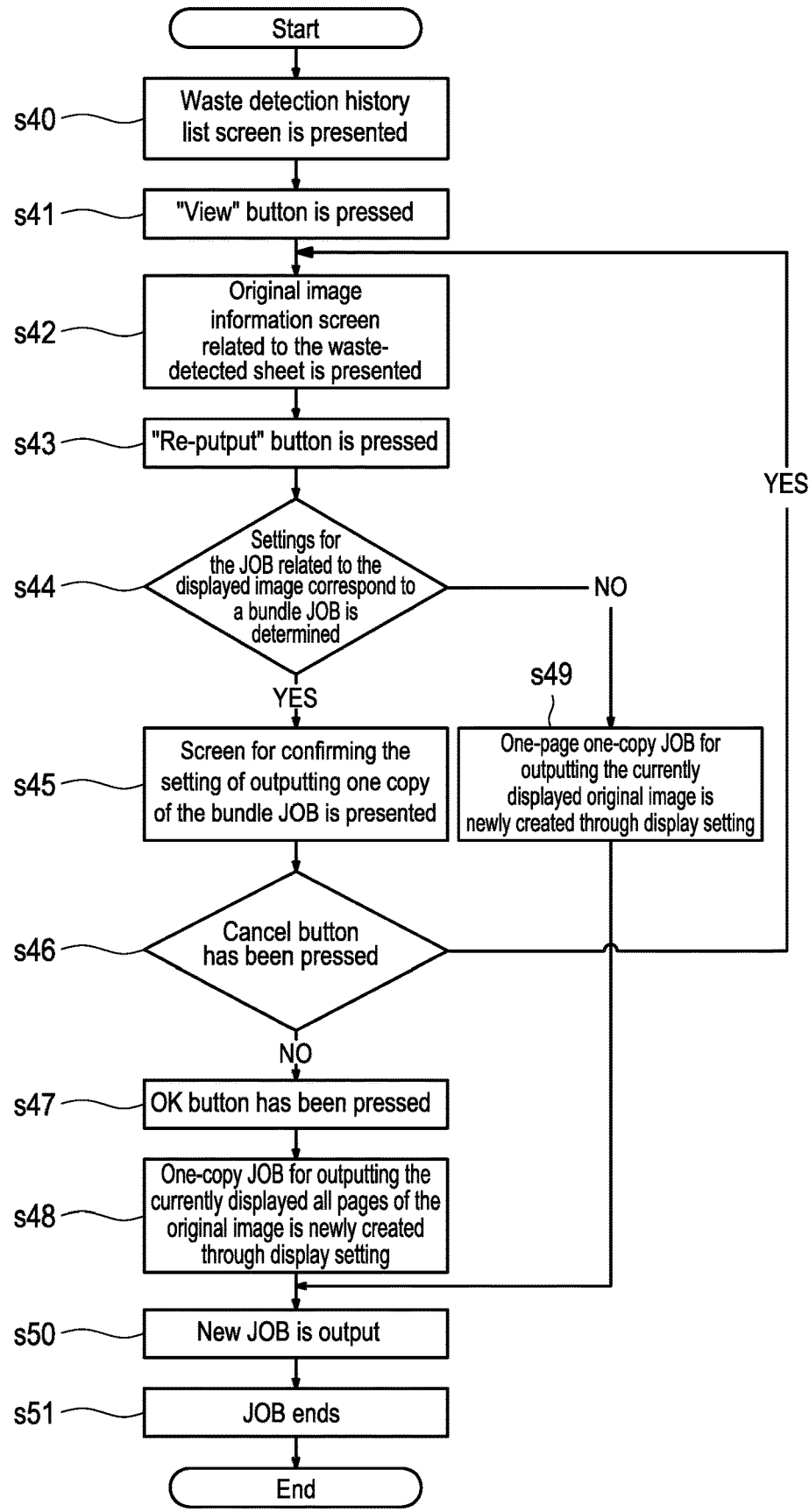
FIG. 8 is similarly a flow chart showing a process for re-outputting a waste-detected page in a bundle JOB.

A process for the re-output of the bundle JOB will now be described with reference to the flow chart of FIG. 8.

The waste detection history list screen is presented (Step s40). If the "view" button in the waste-detected sheet field related to the JOB to re-output is pressed on the waste detection history list screen (Step s41), an original image information screen (FIG. 6) related to the waste-detected sheet is presented (Step s42).

Afterwards, if the "re-output" button is pressed (Step s43), whether the settings for the JOB related to the displayed image correspond to a bundle JOB is determined (Step s44).

In the case of a bundle JOB (Step s44, YES), a screen for confirming the setting of outputting one copy of the bundle JOB is presented (Step s45), and whether the cancel button has been pressed is determined (Step s46). If the cancel button has been pressed (Step s46, YES), the process returns to Step s42. If the cancel button has not been pressed (Step s46, No), pressing the OK button (Step s47) newly creates a one-copy JOB for outputting all pages of the original image through display setting (Step s48). Afterwards, the newly created JOB is output (Step s50), and the JOB ends (Step s51).

In Step s44, if the settings for the JOB related to the displayed image do not correspond to a bundle JOB (Step s44, NO), a one-page one-copy JOB for outputting the currently displayed original image is newly created through display setting (Step s49), and the newly created JOB is output (Step s50), and the JOB ends (Step s51).

Through this process, when the JOB for which waste has been detected is a bundle JOB, the JOB can be re-output in a desired output state.

(In Case of Double-Sided Printing Job)

A waste-detected page can be present on a double-sided sheet. Saving and reprinting the original image information related to only one side of the waste-detected page does not produce a desired output.

In this embodiment, when the waste-detected page is present on a double-sided sheet, at least the original image information related to the waste-detected page and the page on the opposite side is saved as original image information, and is associated with waste detection list information. In response to a command to reprint the waste-detected page, at least the waste-detected page and the page on the opposite side from the side with the waste-detected page are reprinted.

Figure 9:
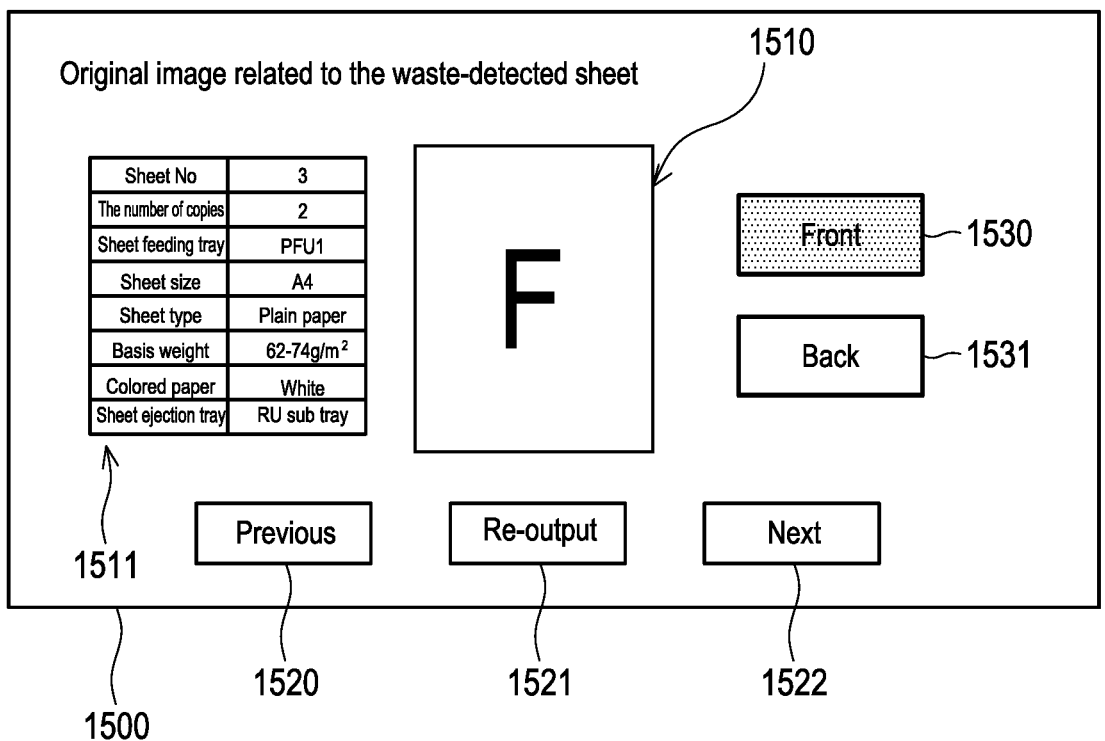
FIG. 9 is similarly a diagram showing an original image display screen related to a waste-detected sheet in a double-sided printing JOB.
Figure 10:
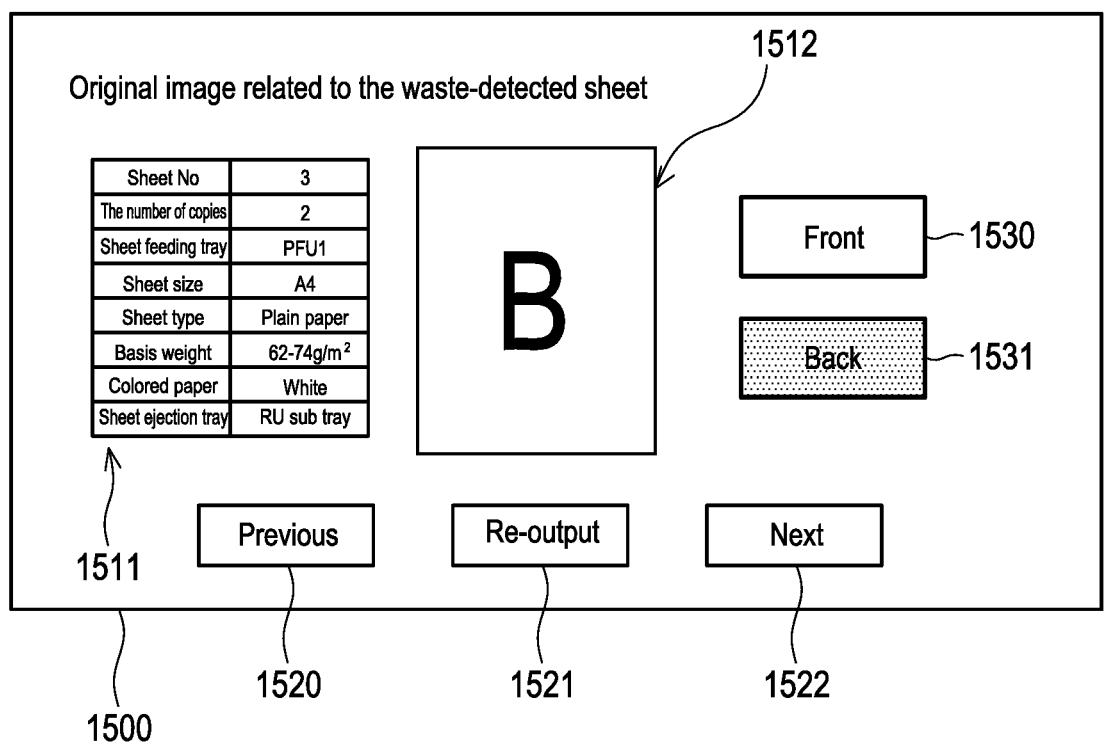
FIG. 10 is similarly a diagram showing an original image display screen related to a waste-detected sheet in a double-sided printing JOB.

FIGS. 9 and 10 show a display screen 1500 showing the original image related to a double-sided printing JOB for which waste has been detected.

On the display screen 1500, like on the display screen 1400 shown in FIG. 3, the original image 1510 is shown in the central portion, and JOB information 1511 is shown on the left side of the display area of the original image 1510. A "front" button 1530 for showing the front side of the waste-detected sheet and a "back" button 1531 for showing the back side of the waste-detected sheet are disposed on the right side of the display area of the original image 1510. On the display screen 1500, pressing the "front" button 1530 turns the button to a deep color and presents the original image on the front side.

As shown in FIG. 10, pressing the "back" button 1531 turns the "back" button 1531 to a deep color and presents the original image 1512 on the back side.

On the display screen 1500, a "previous" button 1520, a "re-output" button 1521, and a "next" button 1522 are shown below the display area of the original image. When more than one waste-detected sheets exist, pressing the "previous" button 1520 presents the previous original image, and pressing the "next" button 1522 presents the next original image. Pressing the "re-output" button 1521 can generate a JOB for outputting a waste-detected sheet and output it. Here, at least the page in which waste has been detected and the page on the opposite side are output by double-sided printing.

A process executed in the event of waste detection in a double-sided printing JOB and a process for re-output will now be explained.

Figure 11:
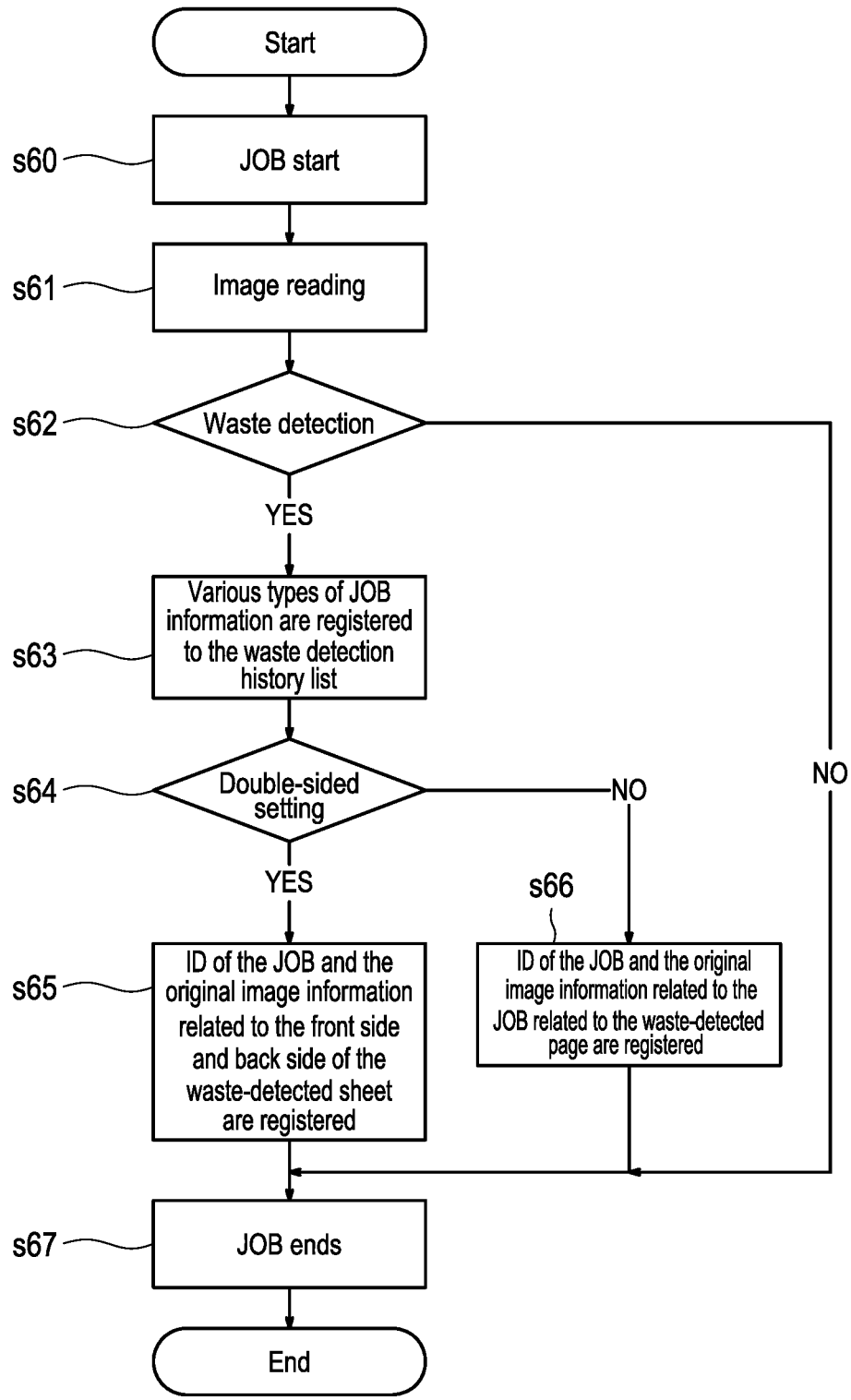
FIG. 11 is similarly a flow chart showing a process for waste detection in a double-sided printing JOB.

A process executed in the event of waste detection in a double-sided printing JOB will now be explained with reference to the flow chart shown in FIG. 11.

The JOB starts (Step s60), and the image on the sheet is read (Step s61). Next, failure/no-failure in the image is determined based on the read image (Step s62).

When waste is detected by failure/no-failure determination for the image (Step s62, YES), various types of JOB information is registered to the waste detection history list (Step s63), and whether the JOB is a JOB related to double-sided setting (double-sided printing) is determined (Step s64). Whether the JOB is related to double-sided printing can be determined based on the output settings for the JOB. If the JOB is a JOB related to double-sided setting (Step s64, YES), the ID of the JOB and the original image information related to the front side and back side of the waste-detected sheet are registered (Step s65), and the JOB ends (Step s67). If no waste is detected in Step s62 (Step s62, NO), the JOB ends (Step s67).

If the JOB is not a JOB related to double-sided setting in Step s64 (Step s64, NO), the ID of the JOB and the original image information related to the waste-detected page of the JOB are registered (Step s66), and the JOB ends (Step s67).

Figure 12:
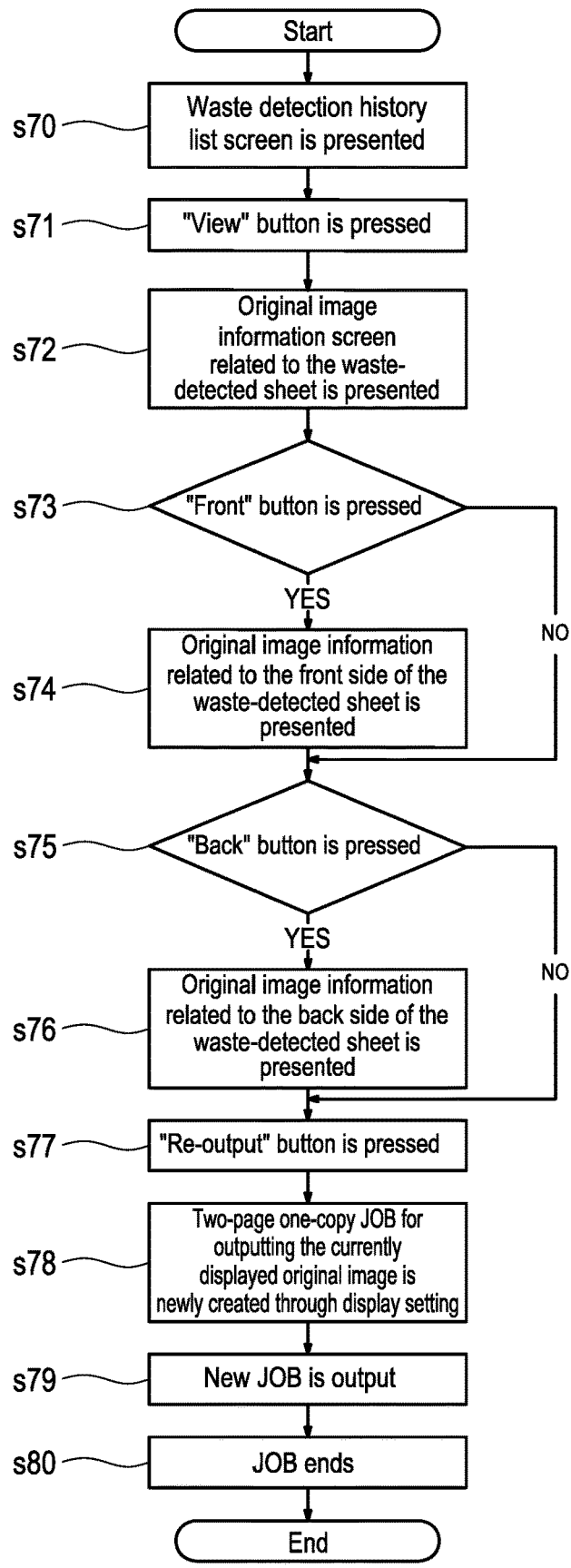
FIG. 12 is similarly a diagram showing a process for re-outputting a waste-detected sheet in a double-sided printing JOB.

A process for the re-output of the double-sided printing JOB for which waste has been detected will now be described with reference to the flow chart of FIG. 12.

The waste detection history list screen is presented (Step s70). If the "view" button in the waste-detected sheet field related to the JOB to re-output is pressed on the waste detection history list screen (Step s71), the original image information screen related to the waste-detected sheet is presented (Step s72).

Whether the "front" button on the original image information screen has been pressed is determined (Step s73). With the "front" button pressed (Step s73, YES), the original image information related to the front side of the waste-detected sheet is presented (Step s74). After Step s74 or if the "front" is not pressed (Step s73), whether the "back" button has been pressed is determined (Step s75).

With the "back" button pressed (Step s75, YES), the original image information related to the back side of the waste-detected sheet is presented (Step s76). After Step s76 or if the "back" button is not pressed (Step s75, NO), the "re-output" button is pressed (Step s77) so that a two-page one-copy JOB for outputting the currently displayed original image is newly created through display setting (Step s78), and the newly created JOB is output (Step s79), and the JOB ends (Step s80). Through this process, even if the JOB for which waste has been detected is a double-sided printing JOB, the JOB can be re-output in a desired output state.

(In Case of Pagination-Added Printing)

When a pagination JOB is output, that is, when the image information is overwritten with another image to print in the timing of when the JOB is output, saving and reprinting the original image information related to the waste-detected page cannot produce a desired output, due to absence of pagination or a failure in addition of proper pagination.

In this embodiment, upon detection of waste in a pagination JOB, not only the original image information related to the waste-detected page but also pagination information is saved. The details will be explained below.

Figure 13:
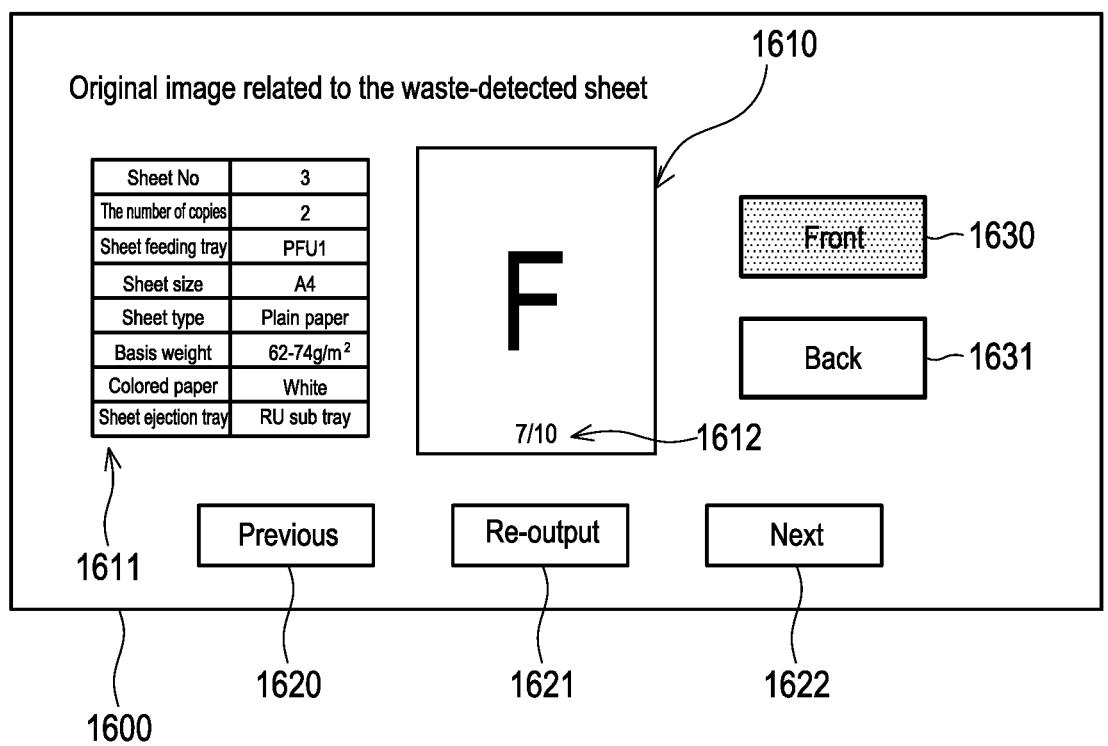
FIG. 13 is similarly a diagram showing an original image display screen related to a waste-detected sheet in a JOB added with pagination.

FIG. 13 is a diagram showing a display screen 1600 presenting the original image upon the output of a pagination JOB.

On the display screen 1600, like in FIG. 9, the original image 1610 is shown in the central portion, and JOB information 1611 is shown on the left side of the display area of the original image 1610. The original image 1610 shows an image added with pagination information 1612.

A "front" button 1630 for showing the front side of the waste-detected sheet and a "back" button 1631 for showing the back side of the waste-detected sheet are disposed on the right side of the display area of the original image 1610. It should be noted that in FIG. 13, the "front" button 1630 is pressed so that the image on the front side is shown as the original image 1610. It should be noted that in the case where double-sided printing is unneeded, the "front" button 1630 and the "back" button 1631 are not shown.

A "previous" button 1620, a "re-output" button 1621, and a "next" button 1622 are shown below the display area of the original image. When more than one waste-detected sheets exist, pressing the "previous" button 1620 presents the previous original image, and pressing the "next" button 1622 presents the next original image. Pressing the "re-output" button 1621 can generate a JOB for re-outputting a waste-detected sheet and output it. Through the re-output operation, the original image added with pagination information is output.

Figure 14:
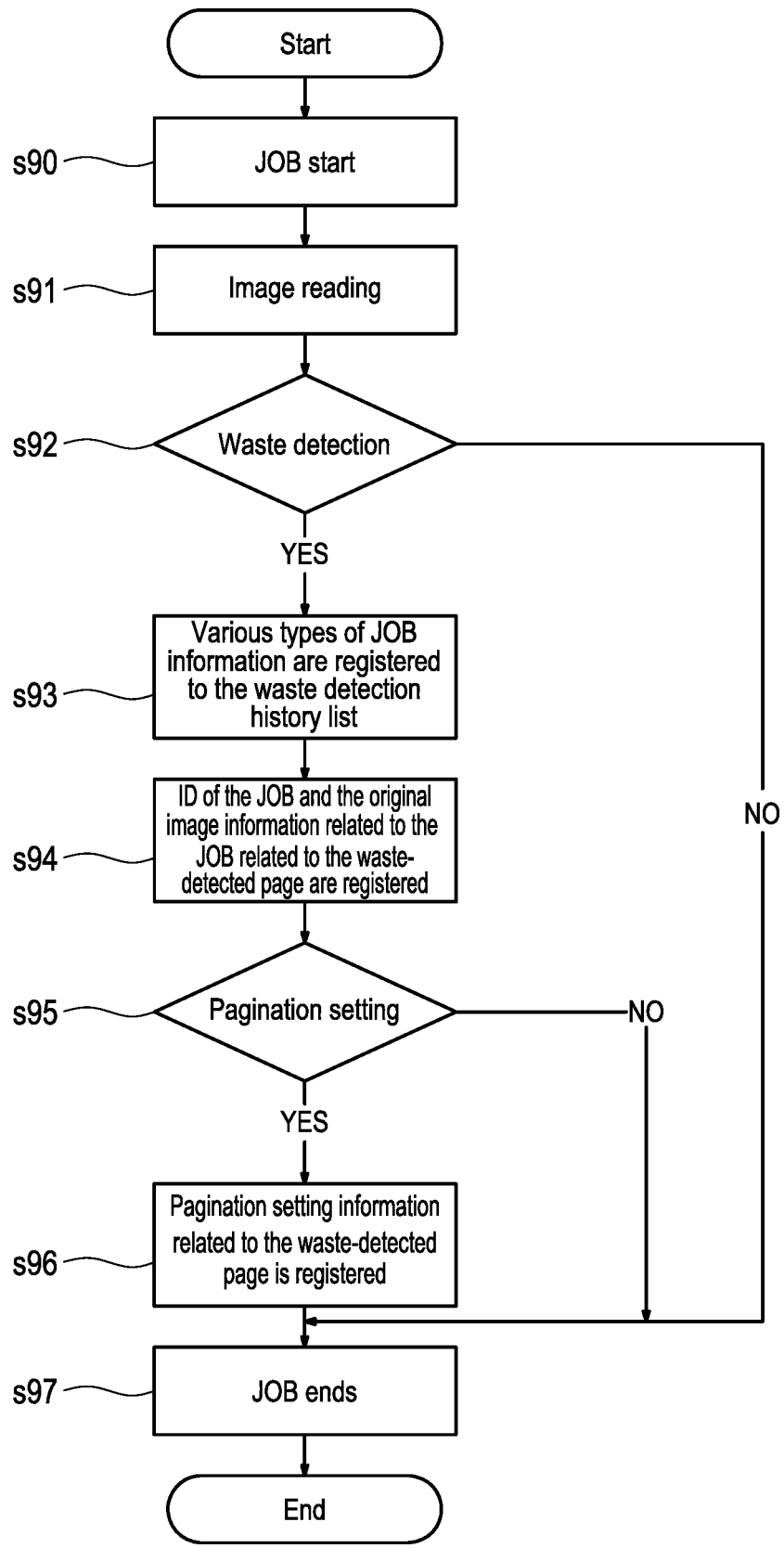
FIG. 14 is similarly a flow chart showing a process for detecting waste in a JOB added with pagination.

A process for waste detection in a pagination JOB will now be explained with reference to the flow chart shown in FIG. 14.

The JOB starts (Step s90), and the image on the sheet is read (Step s91). Next, failure/no-failure in the read image is determined (Step s92).

When waste is detected by failure/no-failure determination for the read image (Step s92, YES), various types of JOB information is registered to the waste detection history list (Step s93), and the ID of the JOB and the original image information related to the waste-detected page are registered (Step s94). Afterwards, whether the JOB includes a pagination setting is determined (Step s95). If a pagination setting is included (Step s95, YES), pagination setting information related to the waste-detected page is registered (Step s96), and the JOB ends (Step s97).

If a pagination setting is not included (Step s95, No) or no waste has been detected in Step s92 (Step s92, NO), the JOB ends (Step s97).

Figure 15:
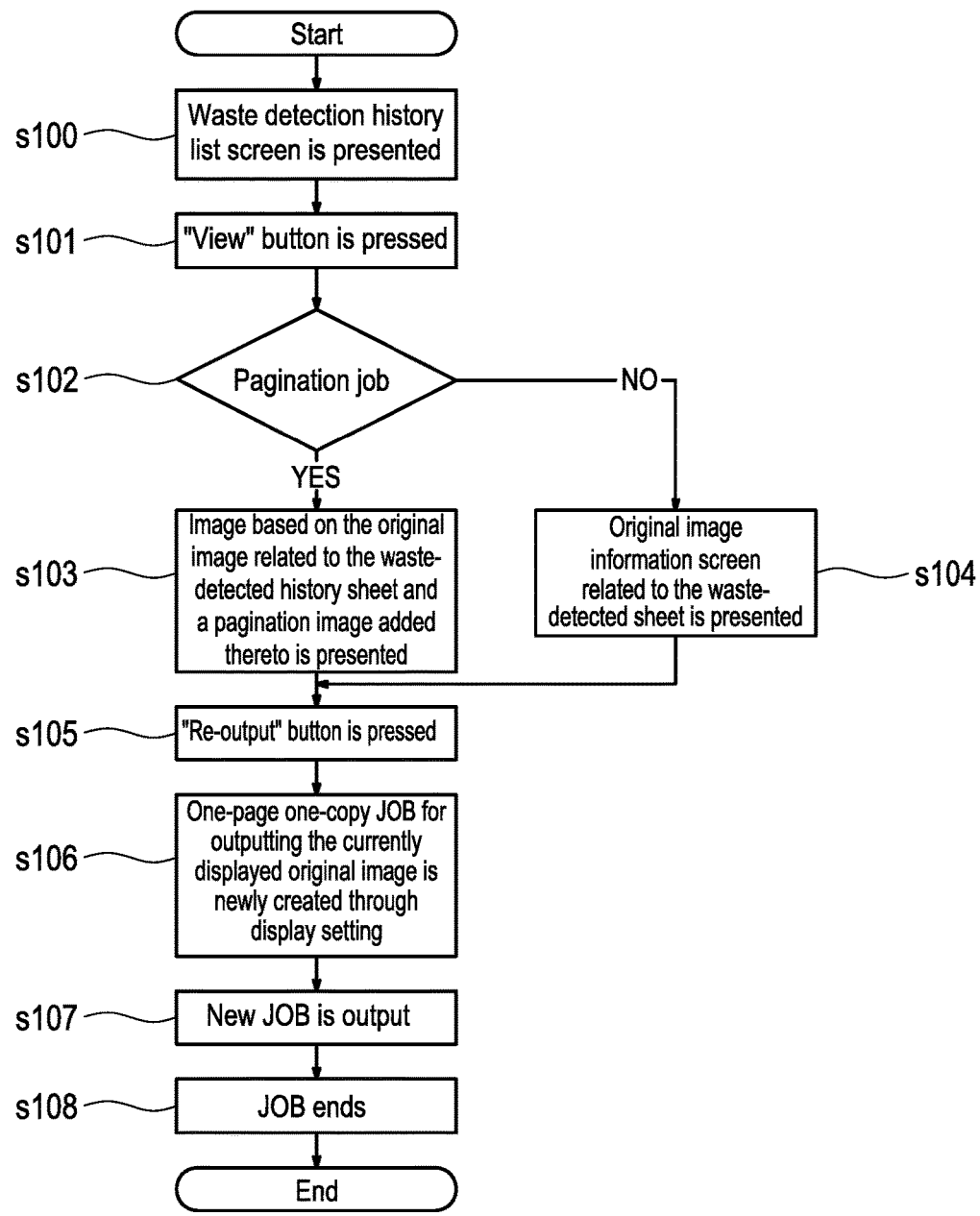
FIG. 15 is similarly a flow chart showing a process for re-outputting a waste-detected sheet in a JOB added with pagination.

A process for the re-output of a pagination JOB for which waste has been detected will now be described with reference to the flow chart of FIG. 15.

The waste detection history list screen is presented (Step s100). If the "view" button in the waste-detected sheet field related to the JOB to re-output is pressed on the waste detection history list screen (Step s101), whether the JOB includes a pagination setting is determined (Step s102).

If the JOB includes a pagination setting (Step s102, YES), an image based on the original image related to the waste-detected history sheet and a pagination image added thereto is presented (Step s103).

If the JOB for which waste has been detected is not a pagination JOB (Step s102, NO), an original image information screen related to the waste-detected sheet is presented (Step s104).

After s103 or Step s104, if the "re-output" button is pressed (Step s105), a one-page one-copy JOB for outputting the currently displayed original image is newly created through display setting (Step s106), and the newly created JOB is output (Step s107), and the JOB ends (Step s108). Through this process, in the event of detection of waste in a JOB to be added with pagination information and output, a desired output with pagination information properly added thereto can be re-output.

(Saving of Correct Image)

In the case where waste detection is performed by comparison between a correct image and an output image, a need can arise for reprinting (resale output) the same thing in order to process an additional order at a later date. If the same correct image as for the last output needs to be used for comparison for waste detection, unless not only the original image information related to the waste-detected page but also the correct image is saved and associated with waste detection history list information, different results of determination for waste detection are unintentionally provided between the previously printed material and the reprinted material and the completed materials have different qualities.

Also in the case where the waste-detected page is re-output, unless the correct image is saved, waste determination cannot be achieved with the same criteria, resulting in unintentional variations in quality between the completed materials.

For this reason, when waste is detected, not only the original image information related to the waste-detected page but also the correct image used for waste determination is saved and, in case of the need for the re-output of the waste-detected page, the saved correct image is used for waste determination.

Figure 16:
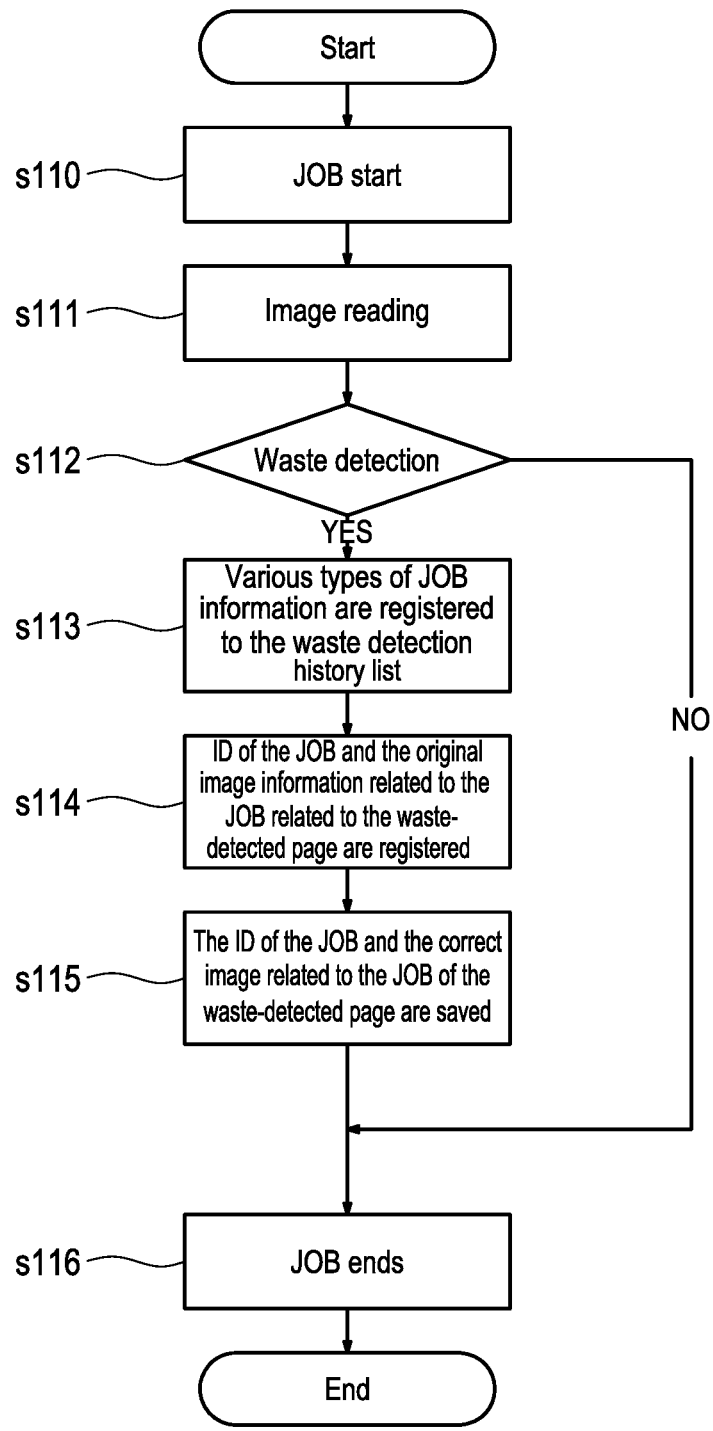
FIG. 16 is similarly a flow chart showing a process for storing a correct image in the event of waste detection.

First, a process for waste detection will be explained with reference to the flow chart shown in FIG. 16.

The JOB starts (Step s110), and the image on the sheet is read (Step s111). Next, failure/no-failure in the read image is determined (Step s112).

If waste is detected by the failure/no-failure determination for the read image (Step s112, YES), various types of JOB information are registered to the waste detection history list (Step s113), and the ID of the JOB and the original image information related to the JOB related to the waste-detected page are registered (Step s114), and the ID of the JOB and the correct image related to the JOB of the waste-detected page are saved (Step s115). The JOB then ends (Step s116).

If no waste is detected in Step s112 (Step s112, NO), the JOB ends (Step s116).

Figure 17:
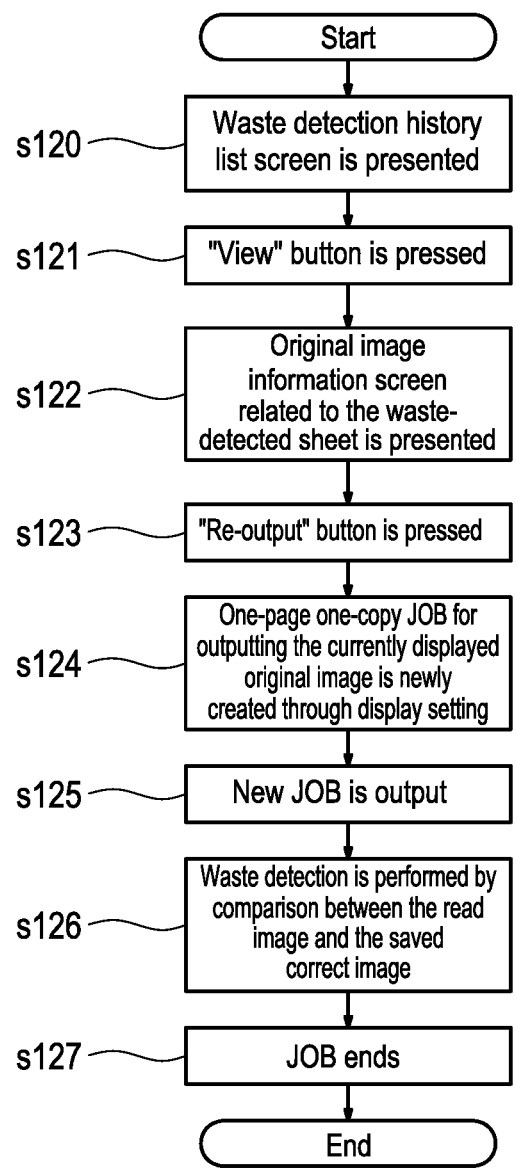
FIG. 17 is similarly a flow chart showing a process for re-outputting a waste-detected sheet and performing waste determination.

A process for the re-output of the waste-detected page will now be described with reference to the flow chart of FIG. 17.

The waste detection history list screen is presented (Step s120). If the "view" button in the waste-detected sheet field related to the JOB to re-output is pressed on the waste detection history list screen (Step s121), the original image information screen related to the waste-detected sheet is presented (Step s122).

Afterwards, if the "re-output" button is pressed (Step s123), a one-page one-copy JOB for outputting the currently displayed original image is newly created through display setting (Step s124), and the newly created JOB is output (Step s125). In the newly created JOB, the image related to the JOB is read and waste detection is performed by comparison between the read image and the saved correct image (Step s126). The JOB then ends (Step s127). Through this process, for the re-output of the waste-detected page, the correct image can be used for waste detection, so that the quality of the re-output can be made equal to that of a normal output.

Although only the correct image related to the waste-detected page is saved according to the above description, correct images related to all pages of the JOB for which waste has been detected can be saved.

(Selection of Page to Re-Output)

When waste is detected for a JOB that has been output, a need can arise for re-outputting, among the pages for which waste has been detected, not all but selected page(s) according to the user's judgement.

Figure 18:
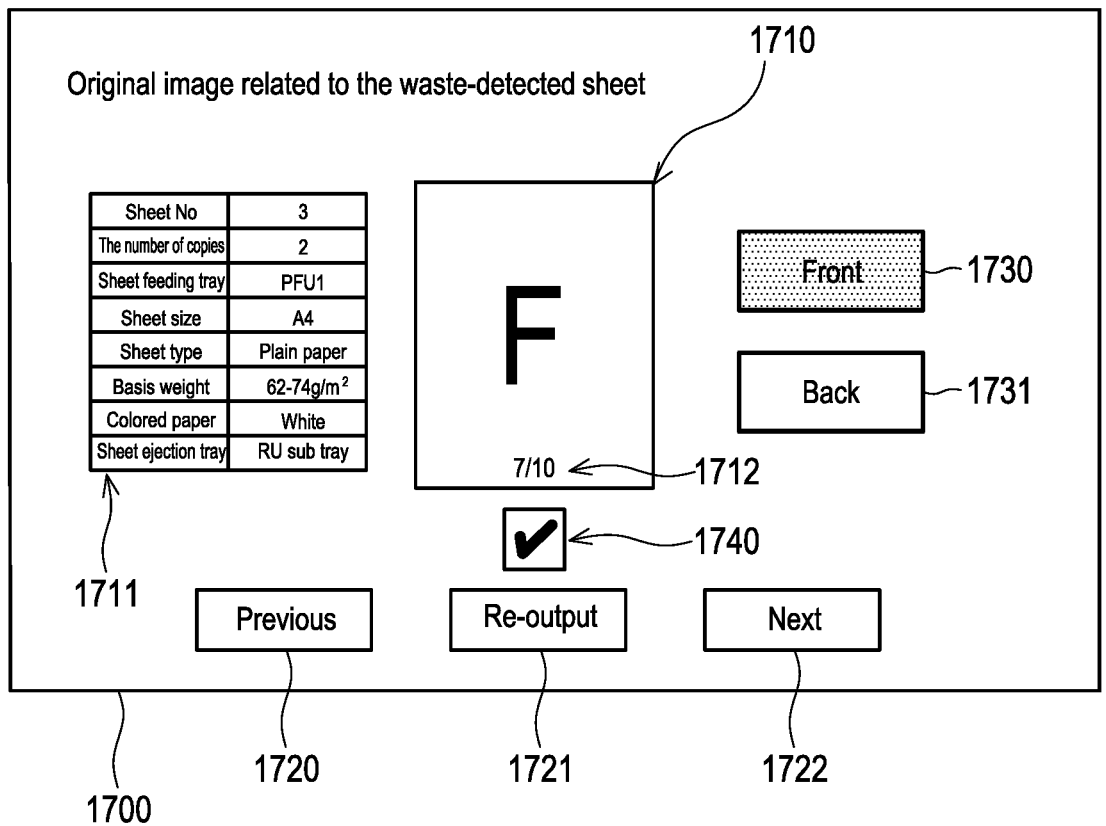
FIG. 18 is similarly a diagram showing an original image display screen on which the output of an arbitrary sheet can be enabled.

FIG. 18 is a diagram showing the display screen 1700 of the original image on which page(s) to re-output can be selected.

On the display screen 1700, like in FIG. 13, the original image 1710 is shown in the central portion, and JOB information 1611 is shown on the left side of the display area of the original image 1710. The original image 1710 shows an image added with pagination information 1712.

A checkbox 1740 is disposed below the display area of the original image 1710. Checking the checkbox 1740 enables setting of a waste-detected page to output. It should be noted that, for selecting pages to re-output, any method other than checking a checkbox can be used. For example, pages to re-output can be selected by designating the pages by text.

On the display screen 1700, a "front" button 1730 for showing the front side of the waste-detected sheet and a "back" button 1731 for showing the back side of the waste-detected sheet are disposed on the right side of the original image 1710. In FIG. 18, the "front" button 1730 is pressed so that the image on the front side is shown as the original image 1710. It should be noted that in the case where double-sided printing is unneeded, the "front" button 1730 and the "back" button 1731 are not shown.

Further, a "previous" button 1720, a "re-output" button 1721, and a "next" button 1722 are shown below the display areas of the original image 1710 and the checkbox 1740. When more than one waste-detected sheets exist, pressing the "previous" button 1720 presents the previous original image, and pressing the "next" button 1722 presents the next original image. Pressing the "re-output" button 1721 makes the pop-up window 1750 shown in FIG. 19 appear for the confirmation of output scheme setting.

Figure 19:
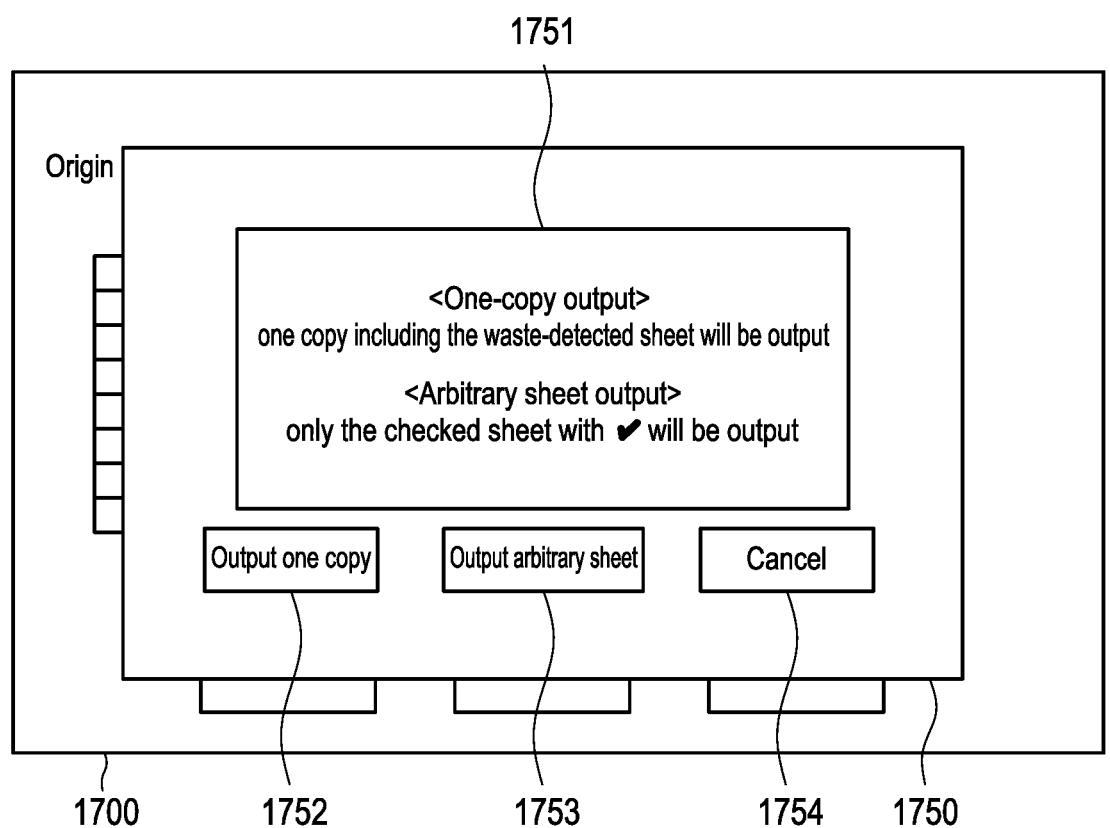
FIG. 19 is similarly a diagram showing a setting confirmation screen related to an output scheme.

FIG. 19 is a diagram showing a setting confirmation screen related to an output scheme.

In FIG. 19 a message field 1751 within the pop-up window 1750 shows "<One-copy output>one copy of the one including the waste-detected sheet will be output" and "<Arbitrary sheet output>only the checked sheet will be output".

An "output one copy" button 1752, an "output arbitrary sheet" button 1753, and a "cancel" button 1754 are disposed below the message field 1751. Pressing the "output one copy" button 1752 outputs all pages (one copy) related to the waste-detected page. Pressing the "output arbitrary sheet" button 1753 outputs only the sheet selected by checking the checkbox 1740 shown in FIG. 18. Pressing the "cancel" button 1754 cancels the re-output operation, closes the pop-up window 1750, and makes a return to the display screen 1700 shown in FIG. 18.

Figure 20:
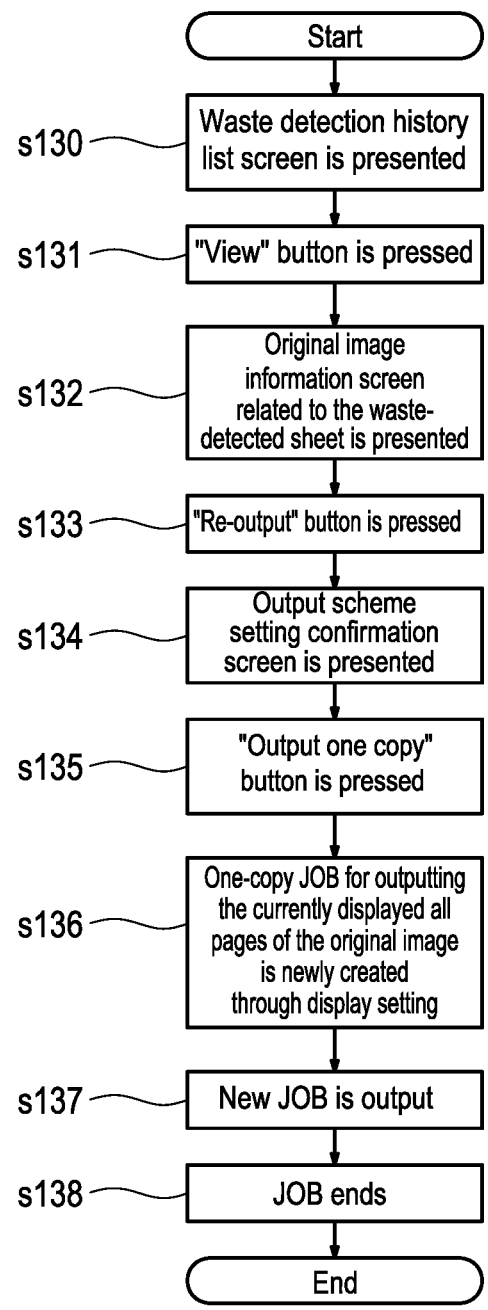
FIG. 20 is similarly a flow chart showing a process for re-outputting all pages of a JOB including a waste-detected page.

In relation to the above-described process, a process for the output of all pages (one copy) related to the waste-detected page will now be described with reference to the flow chart of FIG. 20.

The waste detection history list screen is presented (Step s130). If the "view" button in the waste-detected sheet field related to the JOB to re-output is pressed on the waste detection history list screen (Step s131), the original image information screen related to the waste-detected sheet is presented (Step s132). Afterwards, if the "re-output" button is pressed (Step s133), an output scheme setting confirmation screen is presented (Step s134).

On the output scheme setting confirmation screen, if the "output one copy" button is pressed (Step s135), a one-copy JOB for outputting all pages of the currently displayed original image is newly created through display setting (Step s136), and the newly created JOB is output (Step s137), and the JOB ends (Step s138).

Figure 21:
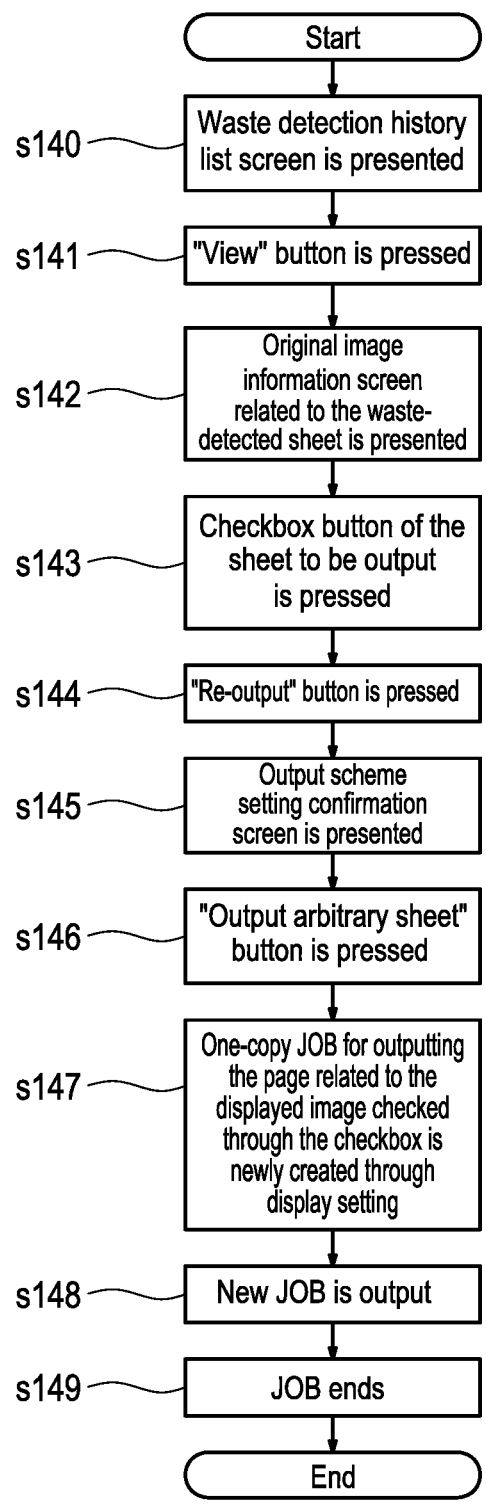
FIG. 21 is similarly a flow chart showing a process for re-outputting an arbitrary sheet selected among waste-detected pages.

A process for outputting arbitrary page(s) among the waste-detected pages will now be explained with reference to the flow chart shown in FIG. 21.

The waste detection history list screen is presented (Step s140). If the "view" button in the waste-detected sheet field related to the JOB to re-output is pressed on the waste detection history list screen (Step s141), the original image information screen related to the waste-detected sheet is presented (Step s142).

If the checkbox button of the sheet to be output is pressed (Step s143) and the "re-output" button is pressed (Step s144), an output scheme setting confirmation screen is presented (Step s145).

On the output scheme setting confirmation screen, pressing the "output arbitrary sheet" (Step s146) newly creates a one-copy JOB for outputting the page related to the displayed image checked through the checkbox through display setting (Step s147), outputs the newly created JOB (Step s148), and ends the JOB (Step s149). Through this process, arbitrary pages can be selected among the pages for which waste has been detected and can be re-output.

In this embodiment, even in the case of a bundle JOB, a double-sided JOB, a pagination JOB, or resale output, a desired re-output material can be produced through the waste detection history list screen.

Although the operation executed in the event of waste detection and the re-output operation have been explained above, taking a bundle JOB, a double-sided printing JOB, and a pagination JOB as examples, the present invention is applicable to JOBs other than these JOBs. Aside from the aforementioned JOBs, in the case of a JOB in which a completed material cannot be produced if only the waste-detected page is re-output, a desired output can be re-output by changing the original image information to be saved, according to the setting content of the JOB to be output, such that the desired output can be produced in the event of a re-output operation.

In this embodiment, in the event of detection of a failure in the output of the transfer medium, a desired output can be accurately obtained by reprinting.

Although the present invention has been described based on the aforementioned embodiment, the scope of the present invention should not be limited to the aforementioned description and appropriate modifications of the aforementioned embodiment can be made without departing from the scope of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming device comprising:
an image forming unit that forms an image on a recording medium in accordance with a JOB; and
a controller that controls the image forming unit, wherein
the controller is capable of acquiring a read image obtained by reading the image on the recording medium, and determining failure/no-failure in the image on the recording-medium in accordance with the read image, and
when the image is determined to have a failure in accordance with the determination, the controller, based on output settings for the JOB, specifies a different page in which the original image information is to be saved together with the original image information of the failure-detected page in which the failure is detected, the different page being a page different from the failure-detected page, and the controller saves, for each JOB, the original image information of the failure detected page and the original image information of the specified different page in association with output history information including the output setting, and makes the failure-detected page to be capable of re-output in accordance with the saved original image information of the failure detected page and the saved original image information of the specified different page.

2. The image forming device according to claim 1, wherein, in response to a command issued to re-output a failure-detected page related to a JOB in accordance with output history information, the controller executes re-outputting of at least the failure-detected page in accordance with the associated original image information.

3. The image forming device according to claim 1, wherein the controller makes the saving into a nonvolatile storage.

4. The image forming device according to claim 1, wherein when the image is determined to have a failure, the controller saves the original image information along with information related to output settings for the JOB.

5. The image forming device according to claim 1, wherein when a JOB for which the failure has been detected is a bundle JOB, the controller saves original image information related to all pages of the JOB and, in the event of the re-output of the failure-detected page, performs the re-output of all pages of the JOB.

6. The image forming device according to claim 1, wherein when a JOB for which the failure has been detected is a JOB involving double-sided printing, the controller saves at least original image information related to a page in which the failure has been detected and original image information related to the page on the back side of the failure-detected page and, in the event of re-output, reprints at least the failure-detected page and the page on the back side of the failure-detected page.

7. The image forming device according to claim 1, wherein
when a JOB for which the failure has been detected is a JOB involving addition of pagination information for printing, the controller saves at least original image information related to a page in which the failure has been detected, and pagination information in a state in which the original image information and the pagination information are associated with the output history information, and
in the event of re-output, reprints the page added with the saved pagination information.

8. The image forming device according to claim 1, wherein
when determining failure/no-failure in the image on the recording medium, the controller determines failure/no-failure in the image by comparison between the read image and a correct image acquired in advance, and
when the image is determined to have a failure, the controller saves the original image information and the correct image related to the failure-detected page in a state in which the original image information and the correct image are associated with the output history information.

9. The image forming device according to claim 8, wherein the controller acquires a read image obtained by reading an image on a re-output recording medium, and determines failure/no-failure in the image on the re-output recording medium by comparison between the read image and the correct image.

10. The image forming device according to claim 1, wherein in the event of reprinting, the controller allows a page to be output to be selected.

11. The image forming device according to claim 1, wherein, in response to a command to reprint, the controller enables selection between multiple options: the output of all pages, and the output of an arbitrary page selected among failure-detected pages.

12. The image forming device according to claim 1, further comprising:
a display that presents information, wherein
when presenting output history information on the display, the controller allows an original image related to the failure-detected page to be presented.

13. A non-transitory computer-readable recording medium storing a program executed on a computer controlling an image forming device for forming an image on a recording medium, wherein
the program causes the computer to perform:
acquiring a read image obtained by reading the image on the recording medium;
determining failure/no-failure in the image in accordance with the read image;
when the image is determined to have a failure in accordance with the determination, based on output settings for the JOB, specifying a different page in which the original image information is to be saved together with the original image information of the failure-detected page in which the failure is detected, the different page being a page different from the failure-detected page, saving, for each JOB, the original image information of the failure detected page and the original image information of the specified different page in association with output history information including the output setting; and
making the failure-detected page to be capable of re-output in accordance with the saved original image information of the failure detected page and the saved original image information of the specified different page.

* * * * *